(12) United States Patent
Sugiyama et al.

(10) Patent No.: US 8,447,473 B2
(45) Date of Patent: May 21, 2013

(54) OCCUPANT PROTECTION APPARATUS AND CONTROL METHOD THEREFOR

(75) Inventors: Takahiro Sugiyama, Toyota (JP); Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/125,080

(22) PCT Filed: Mar. 5, 2010

(86) PCT No.: PCT/IB2010/000652
§ 371 (c)(1),
(2), (4) Date: Apr. 20, 2011

(87) PCT Pub. No.: WO2010/119314
PCT Pub. Date: Oct. 21, 2010

(65) Prior Publication Data
US 2012/0101688 A1    Apr. 26, 2012

(30) Foreign Application Priority Data
Apr. 17, 2009  (JP) .................. 2009-101062

(51) Int. Cl.
*B60R 22/00*    (2006.01)
(52) U.S. Cl.
USPC .......................................................... 701/45
(58) Field of Classification Search
USPC .............. 701/45; 280/733–736, 801.1, 801.2, 280/802, 204, 806, 808
See application file for complete search history.

(56) References Cited

U.S. PATENT DOCUMENTS

| | | | |
|---|---|---|---|
| 5,607,118 A * | 3/1997 | Dybro et al. ................ | 242/379.1 |
| 5,947,514 A * | 9/1999 | Keller et al. .................. | 280/742 |
| 6,082,764 A * | 7/2000 | Seki et al. ..................... | 280/735 |
| 6,126,194 A * | 10/2000 | Yaniv et al. ................... | 280/733 |
| 6,336,656 B1 | 1/2002 | Romeo | |
| 6,547,273 B2 | 4/2003 | Grace et al. | |
| 7,571,931 B2 | 8/2009 | Watanabe | |
| 2007/0096447 A1* | 5/2007 | Tabe ............................. | 280/735 |

FOREIGN PATENT DOCUMENTS

| | | |
|---|---|---|
| EP | 1640223 A2 | 3/2006 |
| JP | 63258239 A | 10/1988 |
| JP | 10226295 A | 8/1998 |
| JP | 11508514 T | 7/1999 |
| JP | 2005297917 | 10/2005 |
| WO | WO-9702162 A1 | 1/1997 |

\* cited by examiner

*Primary Examiner* — Mary Cheung
(74) *Attorney, Agent, or Firm* — Gifford, Krass, Sprinkle, Anderson & Citkowski, P.C.

(57) ABSTRACT

A vehicular occupant protection apparatus (10) is equipped with a seatbelt (12) including a shoulder belt portion (12A) fitted to a occupant (P) from a shoulder part thereof to a lumbar part thereof, a pretensioner mechanism (24) that is actuated to remove slack in the seatbelt (12), a force limiter mechanism (26) for limiting a restraint load applied to the occupant by the seatbelt (12), an air belt device (44) that supplies an air belt (45) with gas to inflate/deploy the air belt (45) between the occupant (P) and an instrument panel, and a occupant protection ECU (55) that actuates the air belt device (44) such that the air belt (45) starts being supplied with gas upon or after start of actuation of the force limiter mechanism (26) following actuation of the pretensioner mechanism (24) in the event of a head-on collision of a vehicle.

15 Claims, 15 Drawing Sheets

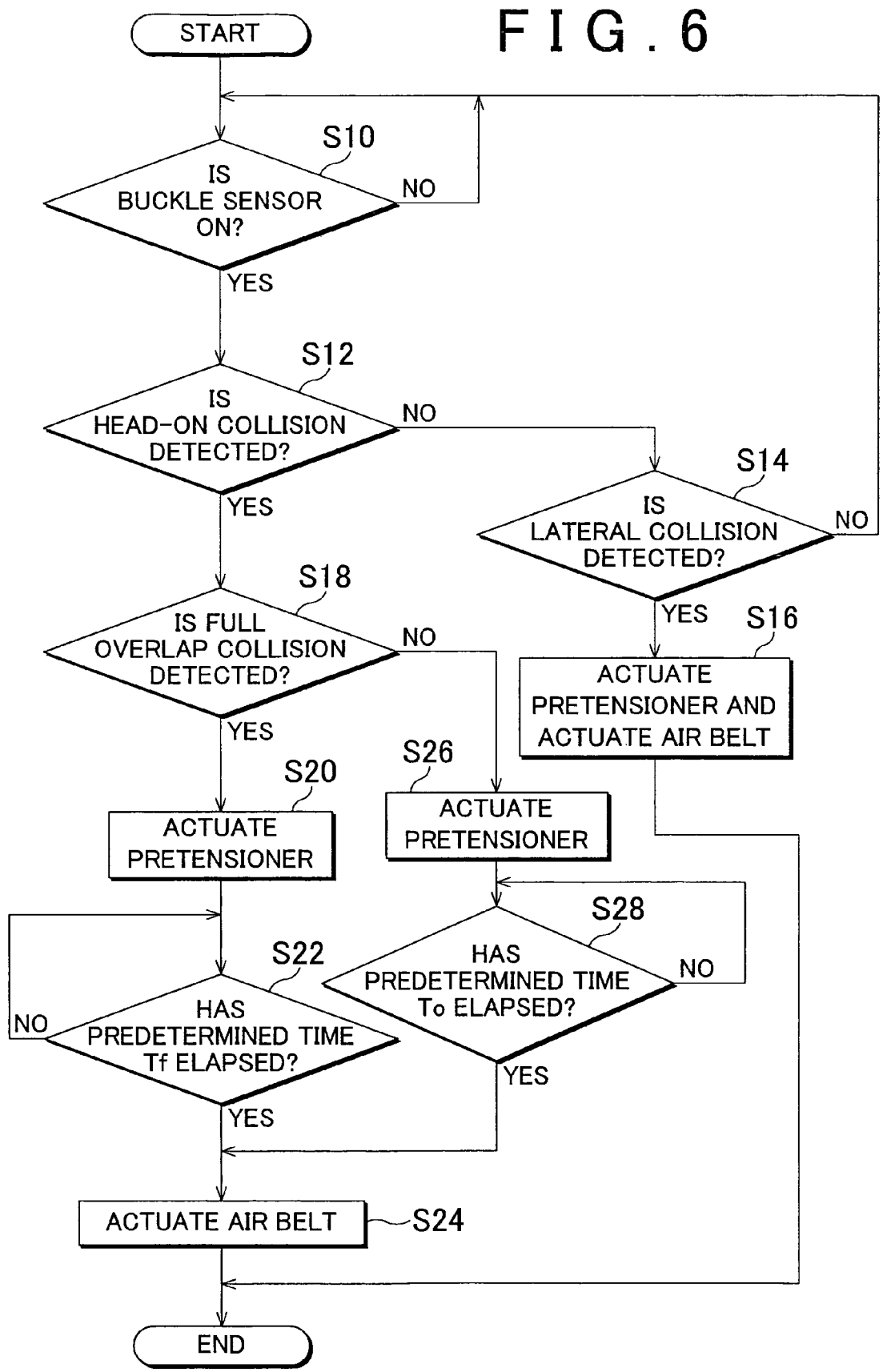

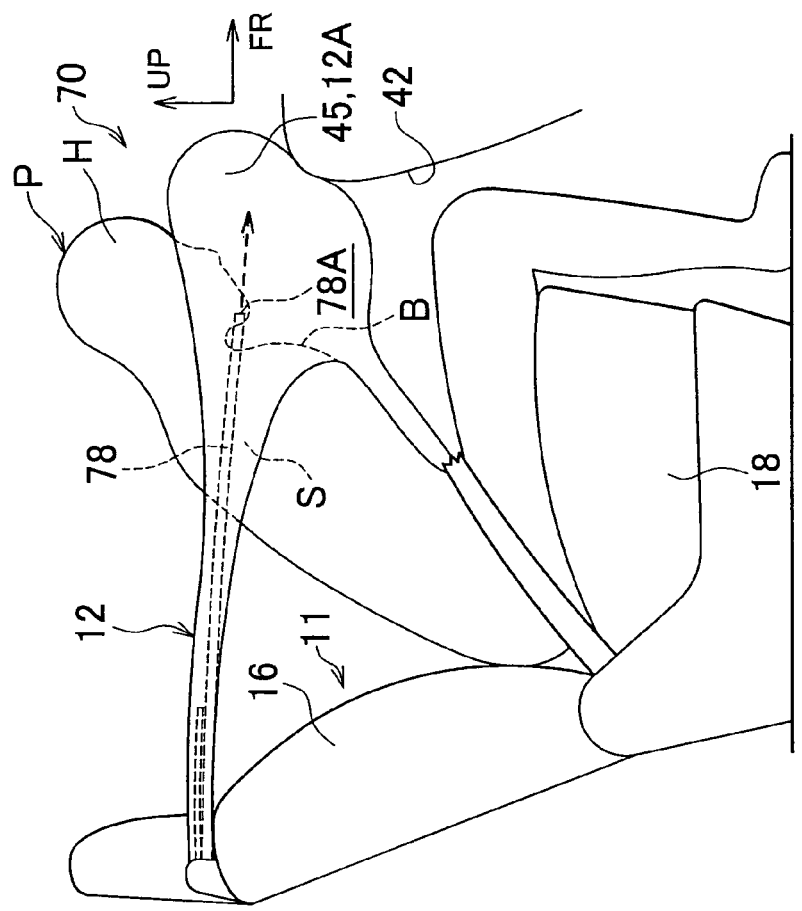
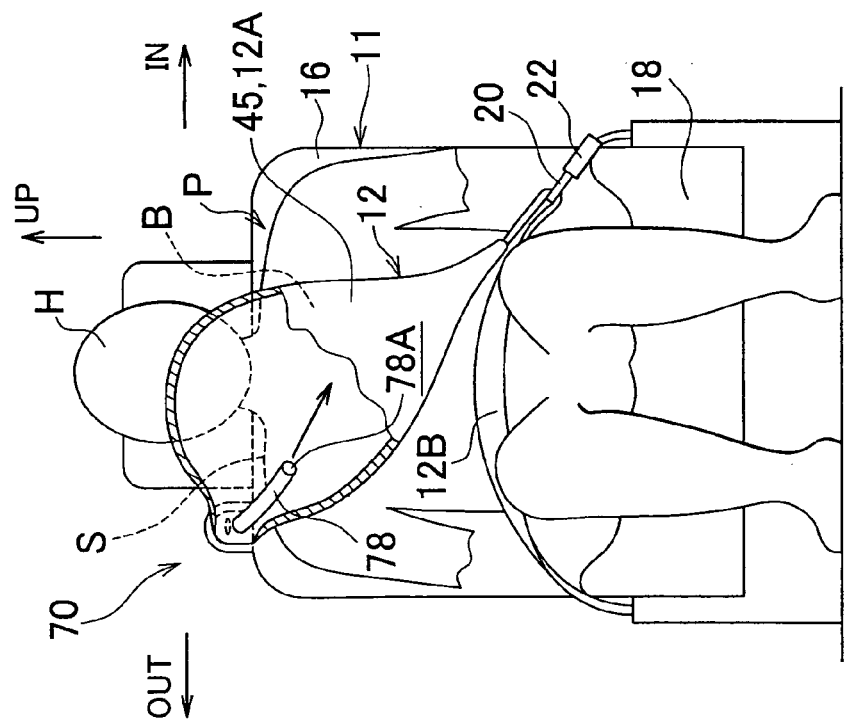
FIG. 8A
FIG. 8B

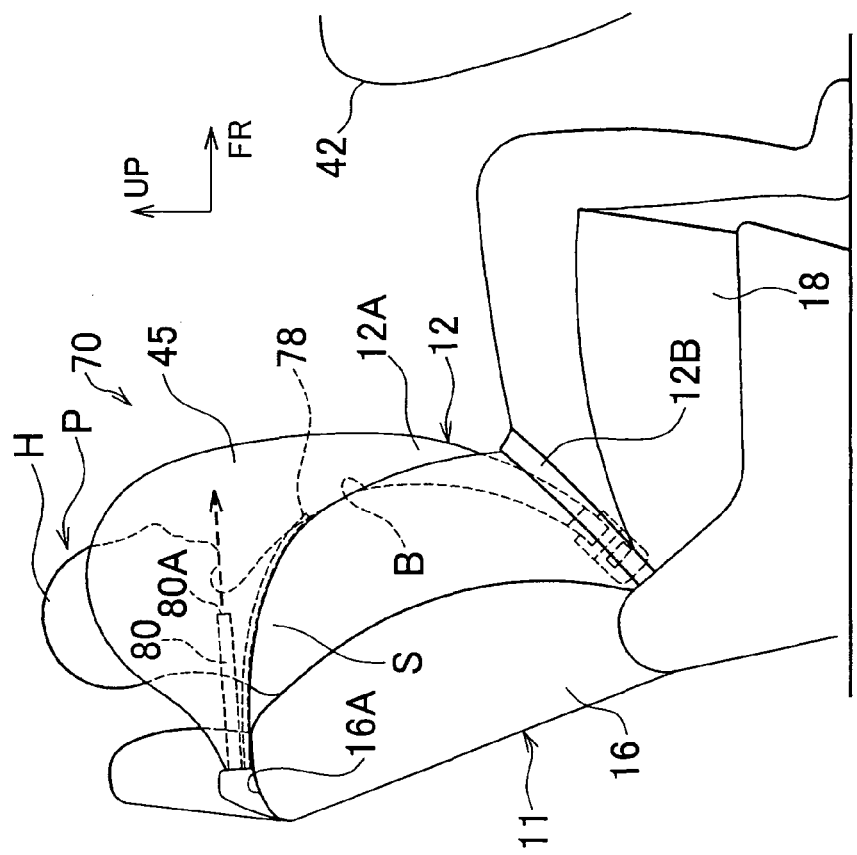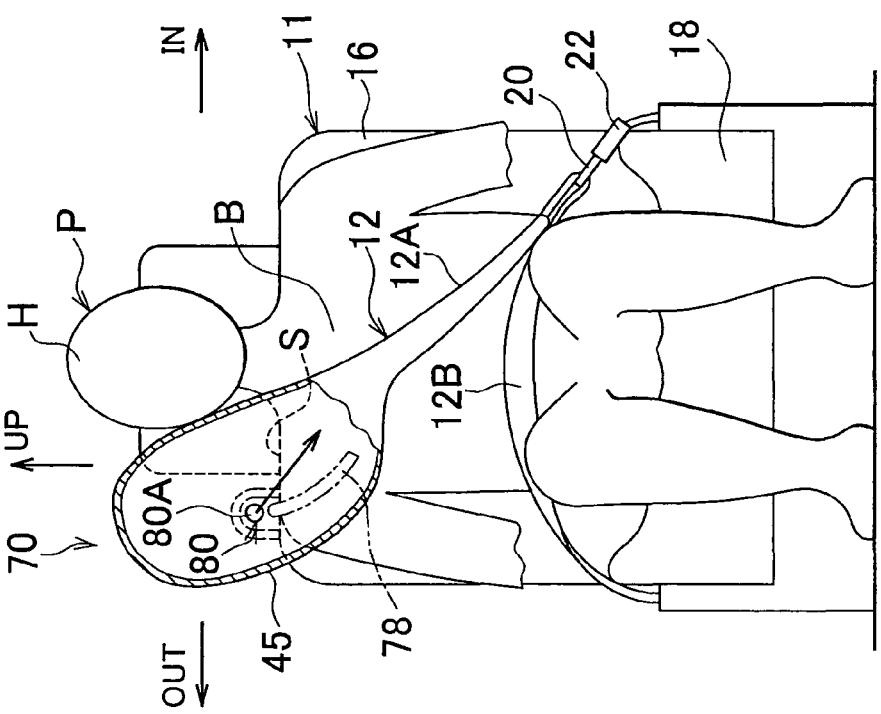

OCCUPANT PROTECTION APPARATUS AND CONTROL METHOD THEREFOR

CROSS-REFERENCE TO RELATED APPLICATIONS

This application is the U.S. national phase of PCT/IB2010/000652 filed Mar. 5, 2010, which claims priority of Japanese Patent Application No. 2009-101062 filed Apr. 17, 2009.

BACKGROUND OF THE INVENTION

1. Field of the Invention

The invention relates to a passenger protection apparatus for protecting an occupant of a vehicle, and a control method for the occupant protection apparatus.

2. Description of the Related Art

There is known an art for actuating a force limiter that allows a seatbelt to be extracted while limiting a restraint load applied by a seatbelt (absorbing energy) after deploying an airbag in the event of a collision of a vehicle (e.g., see Published Japanese Translation of PCT Application No. 11-508514 (JP-A-11-508514)). Further, there is known an art in which a seatbelt is provided with an inflation portion for a head-on collision (e.g., see Japanese Patent Application Publication No. 63-258239 (JP-A-63-258239) and Japanese Patent Application Publication No. 2005-297917 (JP-A-2005-297917)). In addition, there is known an art in which a gas inflation type seatbelt is provided at an upper portion thereof and a lower portion thereof with gas pressure inlet ports respectively, gas is pressurized from the inlet port at the upper portion in the event of a lateral collision, and gas is pressurized from the inlet port at the lower portion in the event of a head-on collision (e.g., see Japanese Patent Application Publication No. 10-226295 (JP-A-10-226295)).

Incidentally, in an art for deploying an airbag between an occupant restrained by a seatbelt and a vehicle interior member in the event of a head-on collision, the airbag needs to have a capacity to fill the space between the occupant and the vehicle interior member. As a result, the airbag is enlarged in size.

SUMMARY OF THE INVENTION

The invention provides an occupant protection apparatus that allows the size of an inflation body to be reduced while ensuring an occupant protection performance, and a control method for the occupant protection apparatus.

A first aspect of the invention relates to a occupant protection apparatus that includes a seatbelt including a region fitted to a occupant from a shoulder part thereof to a lumbar part thereof to restrain the occupant, a slack removal device that is actuated to remove slack in the seatbelt, a load limitation device that is actuated in response to a head-on collision of a vehicle to limit a restraint load applied to the occupant by the seatbelt, and an inflation body deployment device that supplies a fluid to an inflation body to inflate/deploy the inflation body between the occupant and a vehicle interior member located in front of the occupant with respect to the vehicle. The occupant protection apparatus is equipped with a control device that actuates the slack removal device and actuates the inflation body deployment device such that the inflation body starts being supplied with the fluid upon or after start of actuation of the load limitation device following actuation of the slack removal device in an event of a head-on collision of the vehicle.

In the foregoing aspect of the invention, at least part of the seatbelt is fitted to the occupant from the shoulder part thereof to the lumbar part thereof. The control device first actuates the slack removal means in the event of a head-on collision of the vehicle. Then, the slack in the seatbelt fitted to the occupant is removed. After that, the occupant moves forward with respect to the vehicle while being restrained by the seatbelt due to inertia resulting from the head-on collision. In this case, the load limitation device is actuated to limit the restraint load of the seatbelt. The control device then actuates the inflation body deployment device to supply the inflation body with the fluid upon or after the start of actuation of the load limitation device. Thus, the inflation body is inflated/deployed between the occupant and the vehicle interior member, and the occupant is restrained by the seatbelt with the restraint load limited by the load limitation device, and is supported by the vehicle interior member via the inflation body. That is, the seatbelt and the inflation body absorb inertial energy of the occupant. As a result, the occupant is protected.

In the foregoing aspect of the invention, the inflation body starts being deployed as soon as or after the occupant starts moving forward with respect to the vehicle while being restrained by the seatbelt. In other words, the inflation body is deployed between the occupant and the vehicle interior member while the occupant moves forward with respect to the vehicle. Therefore, the clearance (the space) between the occupant and the vehicle interior member where the inflation body is to be deployed is small. Thus, the inflation body and the inflation body deployment device including the means for supplying the inflation body with the fluid can be reduced in size.

In the foregoing aspect of the invention, the inflation body can be reduced in size while ensuring an occupant protection performance. Further, in the foregoing aspect of the invention, the inflation body can be deployed at a timing when the occupant is required to be restrained by the inflation body. As a result, a contribution to an improvement in the occupant protection performance is made.

In the foregoing aspect of the invention, the inflation body may be provided in a region including that region of the seatbelt which is fitted to a chest part of the occupant.

In the foregoing aspect of the invention, the inflation body is provided on the seat belt, namely, on the occupant side. Therefore, the inflation body is likely to be deployed at an appropriate position for the occupant, namely, at a position in front of the chest part thereof. Thus, the inflation body can further be reduced in size.

In the foregoing aspect of the invention, the inflation body may be provided in a region including that region of the seatbelt which is fitted to the shoulder part of the occupant. In the foregoing aspect of the invention, the control device may actuate the inflation body deployment device without actuating the slack removal device or actuate the inflation body deployment device and the slack removal device simultaneously in the event of a lateral collision of the vehicle.

In the foregoing aspect of the invention, in the event of a head-on collision of the vehicle, the slack removal device, the load limitation device, and the inflation body deployment device start being actuated in this order (the load limitation device and the inflation body deployment device may start being actuated simultaneously) to protect the occupant. On the other hand, in the event of a lateral collision of the vehicle, the inflation body deployment device is actuated alone, or the inflation body deployment device and the slack removal device are actuated simultaneously. Thus, the inflation body provided on the seatbelt fitted to the occupant (on that region of the seatbelt which is fitted to the shoulder part of the occupant) is inflated/deployed in a region including a space above the shoulder part of the occupant to protect the occupant from the lateral collision. Thus, in the foregoing aspect of the invention, the inflation body is commonly used for a head-on collision and a lateral collision. Therefore, the inflation body can be centralized to further reduce the size of the inflation body deployment device.

In the foregoing aspect of the invention, the inflation body deployment device may be designed to allow the inflation body to be deployed at a plurality of deployment positions with respect to the seatbelt, and the control device may actuate the inflation body deployment device such that the inflation body is deployed at that one of the deployment positions which corresponds to a collision type of the vehicle.

In the foregoing aspect of the invention, for example, the deployment position of the inflation body with respect to the seatbelt is changed depending on whether a head-on collision or a lateral collision occurs. The occupant is thereby protected in accordance with a collision type. That is, the occupant can be protected in accordance with the collision type by the inflation body centralized as described above.

In the foregoing aspect of the invention, the inflation body deployment device may have set therein a plurality of fluid supply positions for the inflation body, and the control device may actuate the inflation body deployment device such that the inflation body is supplied with the fluid at that one of the positions which corresponds to a collision type of the vehicle.

In the foregoing aspect of the invention, the inflation body deployment device has set therein the plurality of the fluid supply positions for the inflation body, and hence is designed to allow the inflation body to be deployed at the plurality of the deployment positions with respect to the seatbelt. The control device changes (makes a changeover in) the fluid supply position for the inflation body in accordance with the collision type. As a result, the inflation body can be deployed at the position corresponding to the collision type.

In the foregoing aspect of the invention, the inflation body deployment device may have a changeover device for making a changeover among fluid supply positions for the inflation body, and the changeover device may be designed such that the fluid supply position for the inflation body is set as a position corresponding to a lateral collision and changes over to a position corresponding to a head-on collision upon actuation of the changeover device.

In the foregoing aspect of the invention, the control device simply actuates the inflation body deployment device in the event of a lateral collision. Thus, the inflation body is supplied with the fluid at the position corresponding to the lateral collision, and hence is deployed at the position corresponding to the lateral collision. On the other hand, the control device makes a changeover in the changeover device and then actuates the inflation body deployment device in the event of a head-on collision. Thus, the inflation body is supplied with the fluid at the position corresponding to the head-on collision, and hence is deployed at the position corresponding to the head-on collision. In the foregoing aspect of the invention, it is required to actuate the inflation body deployment device after actuation of the load limitation device in the event of a head-on collision, and on the other hand, to actuate the inflation body deployment device within a short time after detection of a lateral collision in the event thereof. Thus, by initially setting the changeover device to the fluid supply side corresponding to the lateral collision as described above, the inflation body deployment device can be actuated at an appropriate timing in the event of a head-on collision while meeting the aforementioned requirement.

In the foregoing aspect of the invention, the inflation body deployment device may have set therein a plurality of fluid supply directions for the inflation body, and the control device may actuate the inflation body deployment device such that the inflation body is supplied with the fluid from a direction corresponding to a collision type of the vehicle.

In the foregoing aspect of the invention, the inflation body deployment device has set therein the plurality of the fluid supply directions for the inflation body, and hence is designed to allow the inflation body to be deployed at a plurality of deployment positions with respect to the seatbelt. The control device changes (makes a changeover in) the fluid supply direction for the inflation body in accordance with the collision type, and can thereby deploy the inflation body at the position corresponding to the collision type.

In the foregoing aspect of the invention, the inflation body may include a first inflation body provided on the vehicle interior member.

In the foregoing aspect of the invention, the inflation body and the inflation body deployment device are reduced in size as described above. Therefore, the degree of freedom in the position of installation of the inflation body deployment device on the vehicle interior member and the degree of freedom in designing the vehicle interior member can be enhanced.

In the foregoing aspect of the invention, the occupant protection apparatus may further include a second inflation body that is supplied with the fluid to be inflated/deployed between the occupant and a vehicle interior member located beside the occupant with respect to the vehicle. The second inflation body may be controlled by the control device.

In the foregoing aspect of the invention, the control device may inflate/deploy the second inflation body without actuating the slack removal device, or inflate/deploy the second inflation body and actuate the slack removal device simultaneously in an event of a lateral collision of the vehicle.

In the foregoing aspect of the invention, the inflation body deployment device may be actuated during actuation of the load limitation device when start of actuation of the load limitation device precedes actuation of the inflation body deployment device.

In the foregoing aspect of the invention, the control device may change a time from detection of a head-on collision of the vehicle to actuation of the inflation body deployment device depending on whether the head-on collision is a full overlap head-on collision or an offset head-on collision.

In the foregoing aspect of the invention, the control device may set a time from detection of the full overlap head-on collision to actuation of the inflation body deployment device shorter than a time from detection of the offset head-on collision to actuation of the inflation body deployment device.

In the foregoing aspect of the invention, the time from detection of the full overlap head-on collision to actuation of the inflation body deployment device may be 50 to 70 milliseconds, and the time from detection of the offset head-on collision to actuation of the inflation body deployment device may be 70 to 90 milliseconds.

A second aspect of the invention relates to a control method for a occupant protection apparatus that includes a seatbelt including a region fitted to a occupant from a shoulder part thereof to a lumbar part thereof to restrain the occupant, a slack removal device that is actuated to remove slack in the seatbelt, a load limitation device that is actuated in response to a head-on collision of a vehicle to limit a restraint load applied to the occupant by the seatbelt, an inflation body deployment device that supplies an inflation body with a fluid to inflate/deploy the inflation body between the occupant and a vehicle interior member located in front of the occupant with respect to the vehicle. The control method for the occupant protection apparatus includes actuating the slack removal device and actuating the inflation body deployment device such that the inflation body starts being supplied with the fluid upon or after start of actuation of the load limitation device following actuation of the slack removal device in an event of a head-on collision of the vehicle.

As described above, the occupant protection apparatus according to the foregoing aspect of the invention and the control method for the occupant protection apparatus have an excellent effect of allowing the inflation body to be reduced in size while ensuring a occupant protection performance.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a flowchart showing an example of the flow of control performed by the occupant protection ECU constituting the vehicular occupant protection apparatus according to the first embodiment of the invention;

FIG. 8A is a front view showing an operated state of a vehicular occupant protection apparatus according to a second embodiment of the invention in the event of a head-on collision;

FIG. 8B is a lateral view showing the operated state of the vehicular occupant protection apparatus according to the second embodiment of the invention in the event of the head-on collision;

FIG. 9A is a front view showing an operated state of the vehicular occupant protection apparatus according to the second embodiment of the invention in the event of a lateral collision;

FIG. 9B is a lateral view showing the operated state of the vehicular occupant protection apparatus according to the second embodiment of the invention in the event of the lateral collision;

DETAILED DESCRIPTION OF EMBODIMENTS

A vehicular occupant protection apparatus 10 as an occupant protection apparatus according to the first embodiment of the invention will be described on the basis of FIGS. 1A to 7B. It should be noted that arrows FR, UP, IN, and OUT drawn appropriately in the respective drawings indicate a forward direction (traveling direction) of an automobile to which the vehicular occupant protection apparatus 10 is applied, an upward direction thereof, an inner direction in a vehicle width direction, and an outer direction in the vehicle width direction respectively. These arrows substantially coincide with a forward direction of a vehicular seat 11 to which the vehicular occupant protection apparatus 10 is applied, an upward direction thereof, one side in a seat width direction, and the other side in the seat width direction respectively.

Figure 2:
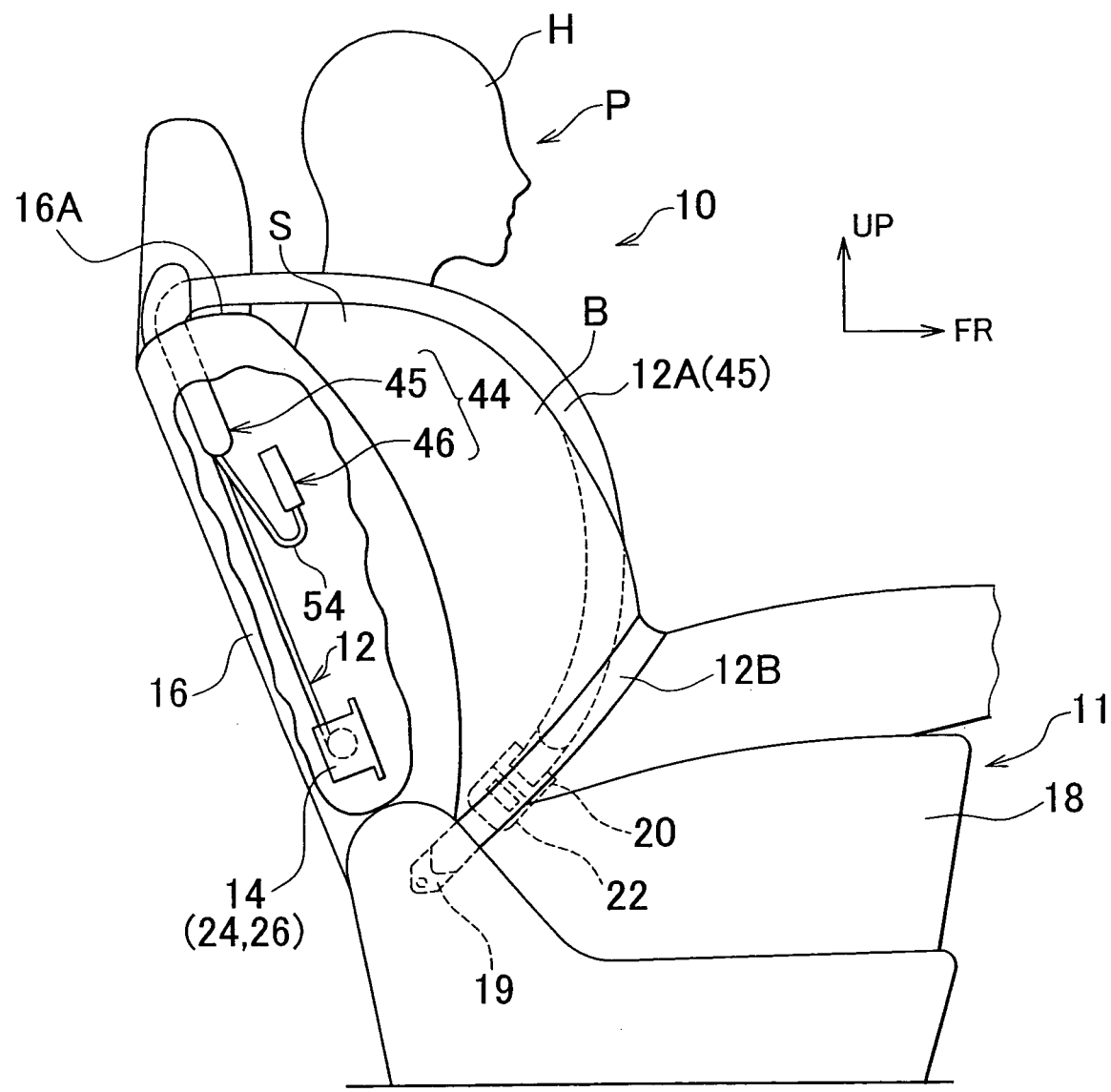
FIG. 2 is a partially cutaway lateral view showing a schematic overall construction of the vehicular occupant protection apparatus according to the first embodiment of the invention.
Figure 3:
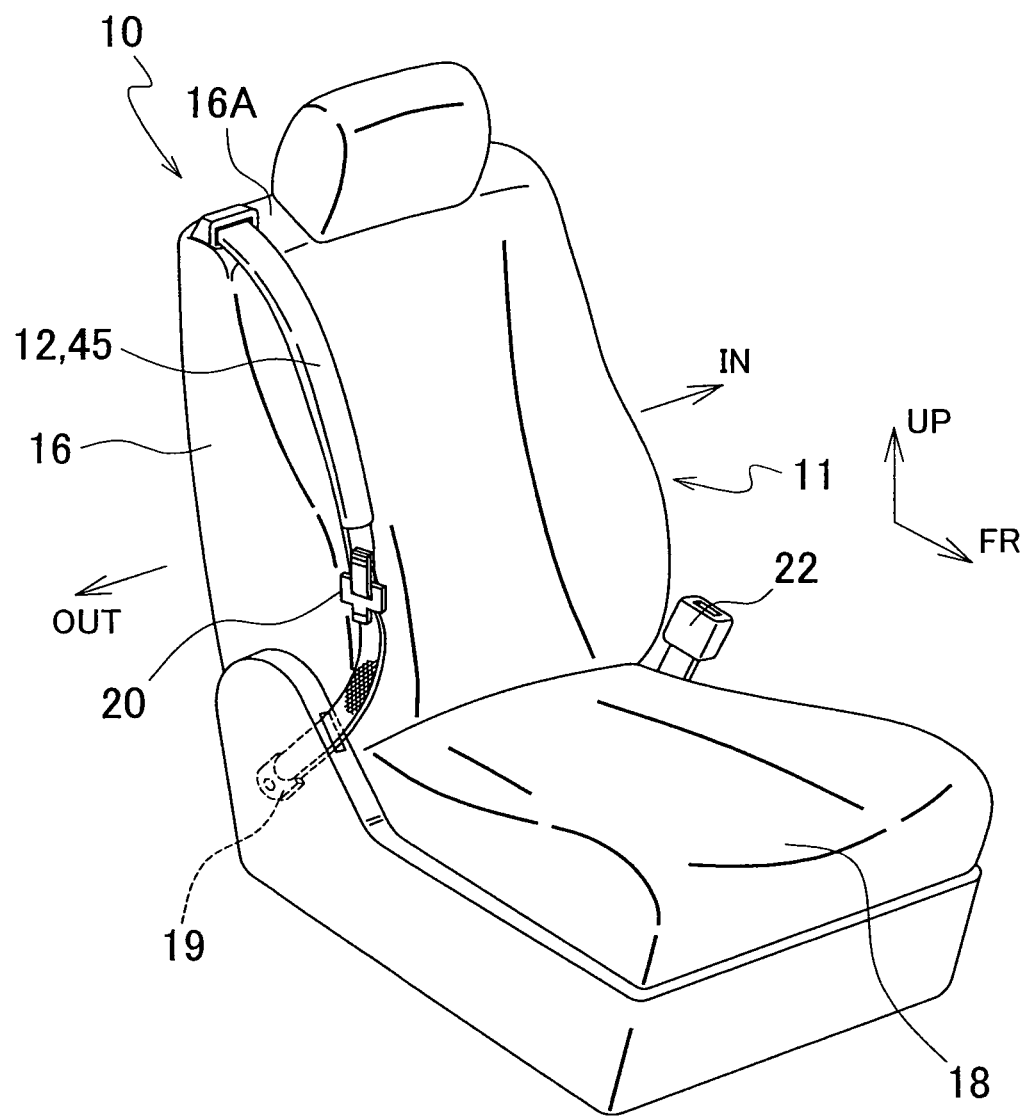
FIG. 3 is a perspective view showing an exterior of the vehicular occupant protection apparatus according to the first embodiment of the invention.

FIG. 2 is a partially cutaway lateral view showing a state in which the vehicular occupant protection apparatus 10 to which the vehicular seat 11 is applied is fitted to an occupant. FIG. 3 is a perspective view showing a state in which the vehicular occupant protection apparatus 10 to which the vehicular seat 11 is applied is not fitted to the occupant. As shown in these drawings, the vehicular occupant protection apparatus 10 is equipped with a seat belt 12 fitted to an occupant P to restrain the occupant. As shown in FIG. 2, the seatbelt 12 is rewound on one end thereof in an extractable manner by a retractor 14 as a rewinding device. In this embodiment of the invention, a seatback 16 constituting the vehicular seat 11 is provided with the retractor 14. On the other hand, the seatbelt 12 is fixed on the other end thereof to a position located behind and beside a seat cushion 18 constituting the vehicular seat 11 by an anchor 19.

The seatbelt 12 is extended vertically with respect to the vehicle on one end side in a width direction of the vehicular seat 11 (on the outside in a vehicle width direction) in a non-fitted state shown in FIG. 3, and is provided substantially at a vertically intermediate portion thereof with a tongue plate 20. The tongue plate 20 can be removably engaged with a buckle 22 disposed on the other side of the vehicular seat 11 in the width direction.

In this vehicular occupant protection apparatus 10, by engaging the tongue plate 20 with the buckle 22, the seatbelt 12 is fitted to the occupant P as shown in FIG. 2. More specifically, the seatbelt 12 is designed such that a shoulder belt portion 12A thereof, which extends from a shoulder portion of the seatback 16 to the tongue plate 20 (a lumbar part of the occupant P), is diagonally hung across an upper body of the occupant and fitted thereto, and that a lap belt portion 12B thereof, which extends from the tongue plate 20 to the anchor 19, is fitted to the lumbar part of the sitting occupant P.

Accordingly, the vehicular occupant protection apparatus 10 according to this embodiment of the invention is an occupant protection apparatus based on a three-point seatbelt device. The vehicular occupant protection apparatus 10 is equipped with a pretensioner mechanism 24 as a slack removal device for removing (eliminating) slack in the seatbelt 12, and a force limiter mechanism 26 as a load limitation device for limiting the load applied by the seatbelt 12 to restrain the occupant P. In this embodiment of the invention, the pretensioner mechanism 24 and the force limiter mechanism 26 are incorporated in the retractor 14. The pretensioner mechanism 24 and the force limiter mechanism 26 can adopt a known structure. Therefore, the pretensioner mechanism 24 and the force limiter mechanism 26 will be described briefly hereinafter while adding a supplementary explanation of the structure of the retractor 14.

Figure 4:
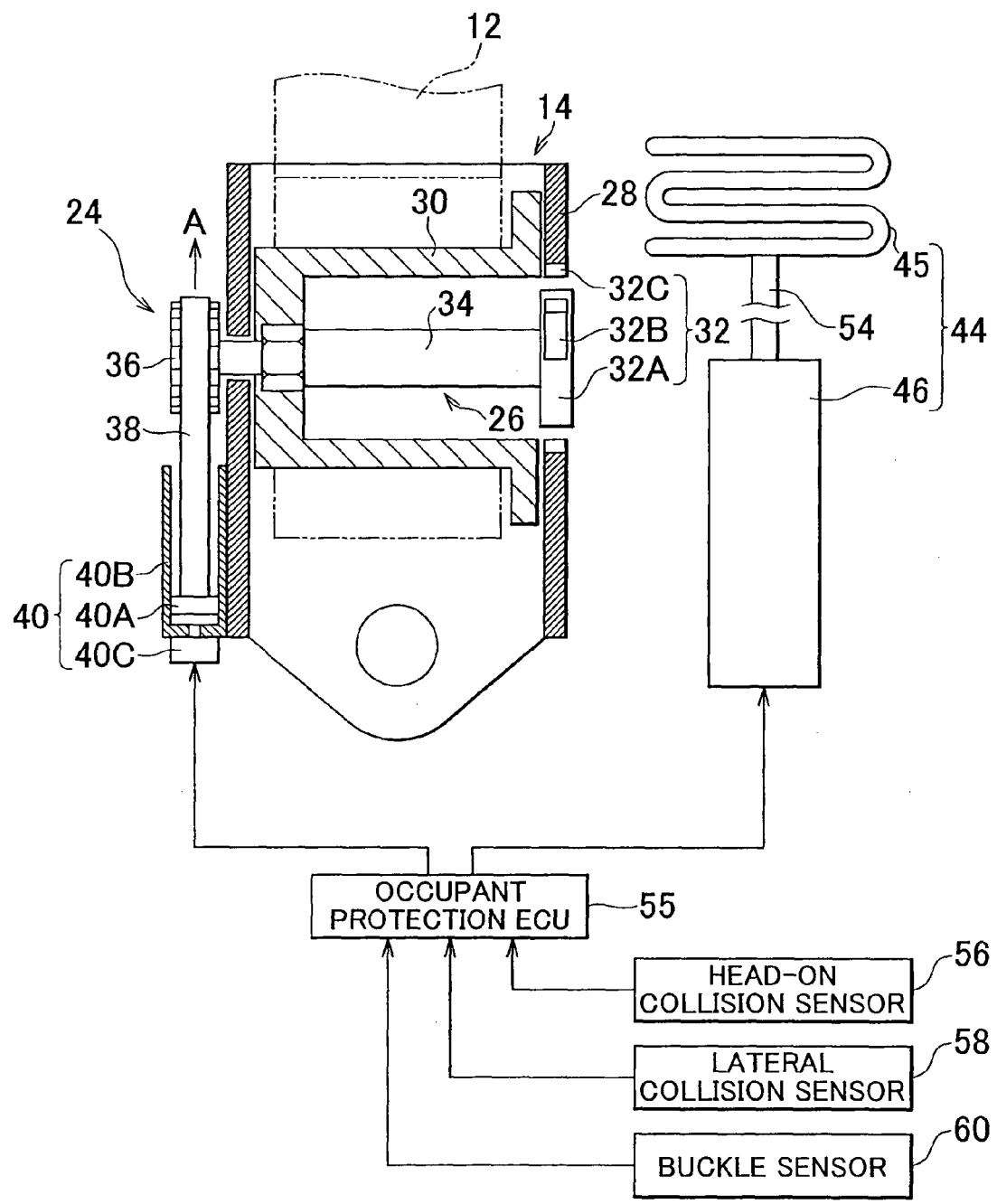
FIG. 4 is a schematic view showing a pretensioner mechanism, a force limiter mechanism, an air belt device, and a occupant protection ECU, which constitute the vehicular occupant protection apparatus according to the first embodiment of the invention.

More specifically, as shown in FIG. 4, the retractor 14 is equipped with a frame 28 and a spool 30 rotatably supported by the frame 28. The seatbelt 12 is wound on one end side thereof around the spool 30. The spool 30 is provided on one end side in an axial direction thereof with a lock mechanism 32 that locks rotation of the spool 30 in such a direction as to extract the seatbelt 12 in response to a collision of the vehicle. The lock mechanism 32 is designed to have a lock portion 32A coaxially coupled to one end of the spool 30 via a torsion bar 34 disposed at an axial center portion of the spool 30, a lock pawl 32B retained by the lock portion 32A, a ratchet 32C formed on the frame 28 such that the lock pawl 32B can mesh therewith, and a known sensing mechanism (not shown) that meshes the lock pawl 32B with the ratchet 32C through the inputting of an impact resulting from a head-on collision or the like.

The pretensioner mechanism 24 in this embodiment of the invention is disposed on the other side of the lock mechanism 32 in the axial direction. The pretensioner mechanism 24 is mainly composed of a pinion 36 that rotates coaxially and integrally with the spool 30, a rack 38 that can mesh with the pinion 36, and an actuator 40 that drives the rack 38 to the pinion 36 side. The actuator 40 has a piston 40A formed at that one end of the rack 38 which is located opposite the pinion 36 side, a cylinder 40B on which the piston 40A can slide, and a micro gas generator (MGG) 40C that supplies gas to that space in the cylinder 40B which is located opposite the rack 38 side. The actuator 40 is designed such that the piston 40A is driven together with the rack 38 in a direction indicated by an arrow A of FIG. 4 due to the pressure of gas supplied into the cylinder 40B upon actuation of the micro gas generator 40C, and the rack 38 rotates the pinion 36 in a direction in which the spool 30 rewinds the seatbelt 12. The spool 30 thus rotated forcibly rewinds the seatbelt 12 to remove slack in (apply a tensile force to) the seatbelt 12.

The force limiter mechanism 26 is designed to allow the spool 30 to rotate in an extraction direction in accordance with a forward movement of the occupant P with respect to the vehicle while limiting the restraint load applied to the occupant P when rotation of the lock portion 32A of the lock mechanism 32 in the extraction direction is locked. In this embodiment of the invention, when the extraction load transmitted from the occupant P via the seatbelt 12 exceeds a predetermined value, the force limiter mechanism 26 allows the seatbelt 12 to be extracted through a twist of the torsion bar 34 locked at one end thereof by the lock portion 32A while limiting the restraint load applied to the occupant P, and hence absorbs part of impact energy. Accordingly, the force limiter mechanism 26 in this embodiment of the invention is designed to be passively actuated in the event of a head-on collision of the vehicle by the torsion bar 34 and a structure for interposing the torsion bar 34 between the spool 30 and the lock mechanism 32.

Further, as shown in FIGS. 2 and 3, the vehicular occupant protection apparatus 10 is equipped with an air belt device 44 as an inflation body deployment device. The air belt device 44 is mainly composed of an air belt 45 as an inflation body that is supplied with gas to be inflated/deployed, and an inflator 46 for supplying the air belt 45 with gas. The air belt 45 is provided on at least part of the seatbelt 12 including the shoulder belt portion 12A (constitutes at least part of the shoulder belt portion 12A).

Figure 5:
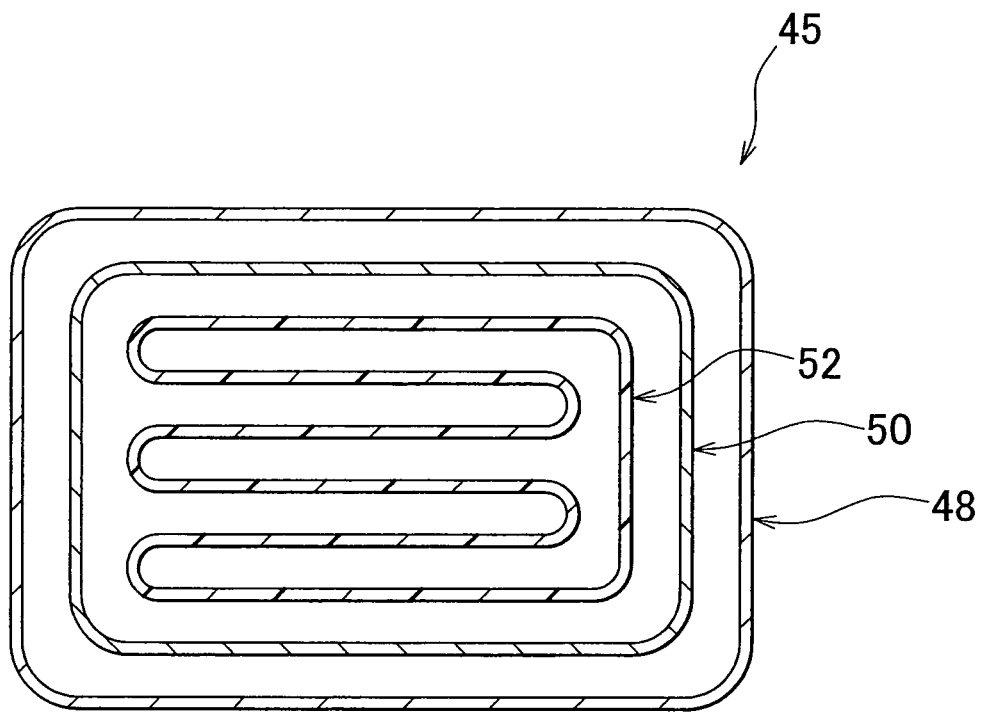
FIG. 5 is a cross-sectional view showing an air belt constituting the vehicular occupant protection apparatus according to the first embodiment of the invention.

More specifically, the air belt 45 is set in that region which is wound around at least the shoulder portion 16A of the seatback 16 and that region which ranges over at least an upper portion of the shoulder belt portion 12A when the seatbelt 12 is fitted to the occupant P sitting in the vehicular seat 11. As shown in FIG. 5, this air belt 45 is mainly composed of a cover 48 as a belt body, an extensible mesh webbing 50 provided inside the cover 48, and an airbag 52 provided in a folded state inside the mesh webbing 50.

Figure 1A:
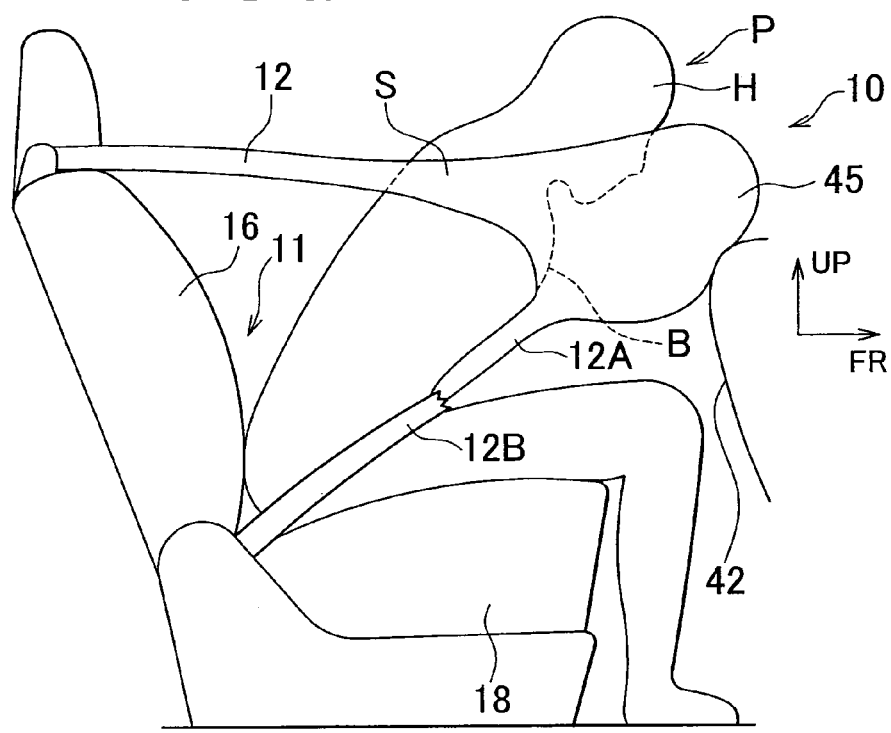
FIG. 1A is a lateral view showing an operated state of a vehicular occupant protection apparatus according to a first embodiment of the invention in the event of a head-on collision.
Figure 1B:
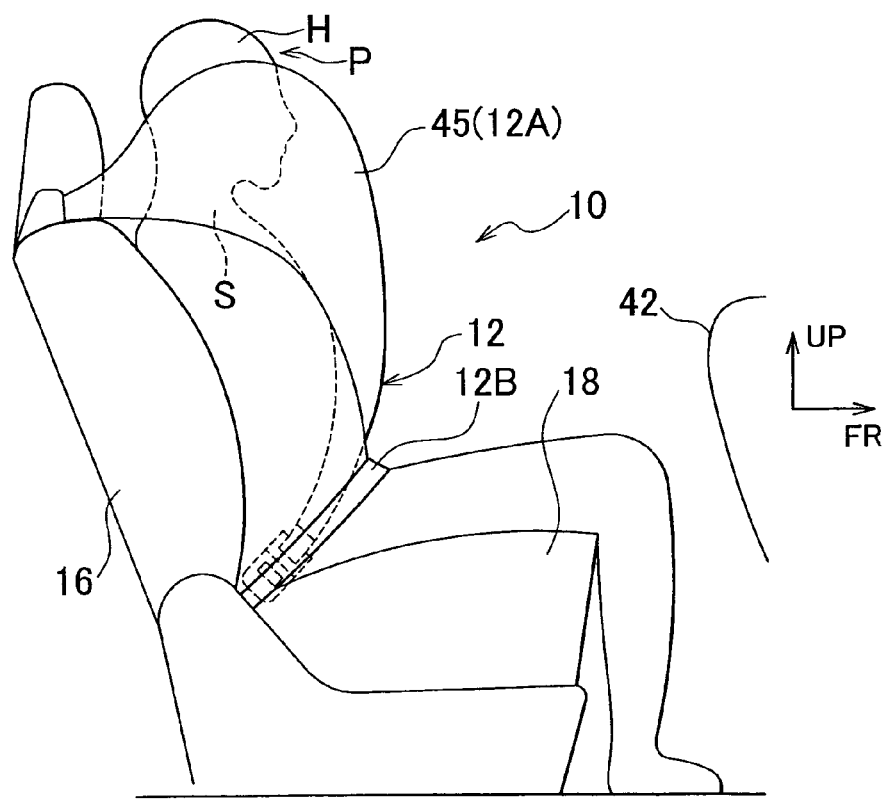
FIG. 1B is a lateral view showing an operated state of the vehicular occupant protection apparatus according to the first embodiment of the invention in the event of a lateral collision.

Then, when the airbag 52 is supplied with gas from the inflator 46 to be inflated, and the air belt 45 is thereby supplied with gas from the inflator 46 to be inflated/deployed between the occupant P and an instrument panel 42 as a vehicle interior member or a side door (not shown) as a whole as shown in FIG. 1A or 1B. That region of the seatbelt 12 other than the air belt 45 is a band-shaped webbing joined to the cover 48 through sewing or the like. Accordingly, the air belt 45 is inflated/deployed at a longitudinally central portion thereof most voluminously.

Further, as shown in FIG. 2, in this embodiment of the invention, the inflator 46 is provided in the seatback 16, is securely supported by a seatback frame (not shown) or the like, and communicates with the airbag 52 via a flexible tube 54 such that the airbag 52 can be supplied with gas.

As shown in FIG. 4, the vehicular occupant protection apparatus 10 is equipped with an occupant protection ECU 55 as a control device. The occupant protection ECU 55 is electrically connected to the micro gas generator 40C constituting the actuator 40 of the pretensioner mechanism 24 and the inflator 46 constituting the air belt device 44, and controls the actuation of (the timing for actuating) these components. More specifically, the occupant protection ECU 55 is electrically connected to a head-on collision sensor 56 for detecting a head-on collision of the vehicle and a lateral collision sensor 58 for detecting a lateral collision of the vehicle, and actuates the micro gas generator 40C and the inflator 46 on the basis of signals from the head-on collision sensor 56 and the lateral collision sensor 58. The head-on collision sensor 56 is composed of, for example, a plurality of sensors to output a signal corresponding to a full overlap head-on collision and a signal corresponding to an offset head-on collision.

Further, in this embodiment of the invention, the occupant protection ECU 55 is also electrically connected to a buckle sensor 60 that outputs a signal corresponding to engagement/disengagement of the tongue plate 20 with/from the buckle 22, and actuates the micro gas generator 40C and the inflator 46 on the condition that an ON signal corresponding to engagement of the tongue plate 20 with the buckle 22 be input from the buckle sensor 60.

The occupant protection ECU 55 controls the timings for actuating the micro gas generator 40C and the inflator 46 such that the pretensioner mechanism 24, the force limiter mechanism 26, and the air belt device 44 are actuated in this order in the event of a head-on collision of the vehicle. In this embodiment of the invention, the occupant protection ECU 55 is designed to actuate the micro gas generator 40C when a signal corresponding to a head-on collision is input from the head-on collision sensor 56, and to actuate the inflator 46 after the lapse of a predetermined time from detection of an actual collision following actuation of the pretensioner mechanism 24. As described above, this predetermined time is set as a time difference from detection of a head-on collision to the start of actuation of the force limiter mechanism 26. Accordingly, the vehicular occupant protection apparatus 10 is designed such that the inflator 46 is actuated to start supplying the air belt 45 with gas simultaneously with the start of actuation of the force limiter mechanism 26 or after the start of actuation of the force limiter mechanism 26 and during actuation thereof.

Further, in this embodiment of the invention, the occupant protection ECU 55 is set such that a predetermined time Tf in the case where the head-on collision sensor 56 detects a full overlap head-on collision is different from a predetermined time To in the case where the head-on collision sensor 56 detects an offset head-on collision (Tf <To).

For example, in the case of a full overlap head-on collision, the predetermined time Tf is set approximately equal to 50 milliseconds (to 70 milliseconds) considering that the time from detection of the collision to actuation of the pretensioner mechanism 24 is approximately 10 milliseconds and the time from detection of the collision to the start of actuation of the force limiter mechanism 26 is at the minimum approximately 10 milliseconds (to 70 milliseconds). When the start of actuation of the force limiter mechanism 26 is at 10 milliseconds, the predetermined time Tf may be suitably set between 50 milliseconds to 70 milliseconds. And, when the start of actuation of the force limiter mechanism 26 is at 70 milliseconds, the predetermined time Tf is set to 70 milliseconds. Namely, the predetermined time Tf may be suitably set to actuate the inflator 46 simultaneously with the start of actuation of the force limiter mechanism 26 or after the start of actuation of the force limiter mechanism 26 and during actuation thereof.

Further, for example, in the case of an offset head-on collision, the predetermined time To is set approximately equal to 90 milliseconds (to 110 milliseconds) considering that the time from detection of the collision to actuation of the pretensioner mechanism 24 is approximately 25 milliseconds and the time from detection of the collision to the start of actuation of the force limiter mechanism 26 is at the maximum approximately 90 milliseconds (to 110 milliseconds). When the start of actuation of the force limiter mechanism 26 is at 30 milliseconds, the predetermined time To may be suitably set between 70 milliseconds to 90 milliseconds. And, when the start of actuation of the force limiter mechanism 26 is at 90 milliseconds, the predetermined time To is set to 90 milliseconds. Namely, the predetermined time To may be suitably set to actuate the inflator 46 simultaneously with the start of actuation of the force limiter mechanism 26 or after the start of actuation of the force limiter mechanism 26 and during actuation thereof.

Further, the occupant protection ECU 55 controls the timings for actuating the micro gas generator 40C and the inflator 46 such that the pretensioner mechanism 24 and the air belt device 44 are actuated substantially simultaneously in the event of a lateral collision of the vehicle. In this embodiment of the invention, the occupant protection ECU 55 is designed to actuate the micro gas generator 40C and the inflator 46 simultaneously in the shortest time when a signal corresponding to detection of the lateral collision is input from the lateral collision sensor 58.

Next, the operation of the first embodiment of the invention will be described with reference to a flowchart as the flow of control by the occupant protection ECU 55 shown in FIG. 6.

In the vehicular occupant protection apparatus 10 constructed as described above, the occupant P sitting in the vehicular seat 11 engages the tongue plate 20 with the buckle 22 while extracting the seatbelt 12 from the retractor 14. Thus, as schematically shown in FIG. 2, the shoulder belt portion 12A is fitted to the upper body of the sitting occupant P, and the lap belt portion 12B is fitted to the lumbar part of the sitting occupant P.

In this state, the occupant protection ECU 55 monitors a head-on collision of the vehicle and a lateral collision of the vehicle on the basis of a signal from the head-on collision sensor 56 and a signal from the lateral collision sensor 58 respectively. More specifically, the occupant protection ECU 55 determines in step S10 whether or not an ON signal is input from the buckle sensor 60. On the condition that an ON signal be input from the buckle sensor 60, the occupant protection ECU 55 proceeds to step S12 to determine whether or not a head-on collision is detected on the basis of a signal from the head-on collision sensor 56. When it is determined that a head-on collision is not detected, the occupant protection ECU 55 proceeds to step S14.

In step S14, the occupant protection ECU 55 determines whether or not a lateral collision is detected on the basis of a signal from the lateral collision sensor 58. When it is determined that a lateral collision is not detected, the occupant protection ECU 55 returns to step S10. On the other hand, when it is determined that a lateral collision is detected, the occupant protection ECU 55 proceeds to step S16 to actuate the micro gas generator 40C and the inflator 46 simultaneously.

Then, the seatbelt 12 is forcibly rewound, and slack in the seatbelt 12 (mainly in the shoulder belt portion 12A) is removed. Also, the air belt 45, which is supplied with gas from the inflator 46, is inflated/deployed as shown in FIG. 1B. In this case, the air belt 45 is voluminously inflated in front of and behind a shoulder part S of the occupant P (to a chest part B), and is deployed between the side door (not shown) and a head part H of the occupant P. Thus, the occupant P is efficiently protected from the lateral collision. The occupant protection ECU 55 then ends the performance of control.

On the other hand, when it is determined in step S12 that a head-on collision is detected, the occupant protection ECU 55 proceeds to step S18 to determine on the basis of a signal from the head-on collision sensor 56 whether or not the head-on collision is a full overlap head-on collision. When it is determined that the head-on collision is a full overlap head-on collision, the occupant protection ECU 55 proceeds to step S20 to actuate the micro gas generator 40C, namely, the pretensioner mechanism 24.

Then, the pretensioner mechanism 24 forcibly rotates the spool 30 in such a direction as to rewind the seatbelt 12, slack in the seatbelt 12 is removed, and the seat belt 12 (the air belt 45) is closely fitted to the occupant P. In this case, owing to an acceleration resulting from the head-on collision, the lock mechanism 32 of the retractor 14 is passively actuated, and the rotation of the spool 30 in such a direction as to extract the seatbelt 12 is locked. Then, when the extraction load applied to the seatbelt 12 exceeds a predetermined value as the occupant P moves forward with respect to the vehicle relatively to the vehicular seat 11 (the vehicle body) due to inertia, the spool 30 is rotated in such a direction as to extract the seatbelt 12 while twisting the torsion bar 34, and allows the occupant P to move forward with respect to the vehicle while limiting the restraint load. That is, the force limiter mechanism 26 is passively actuated.

After the execution of step S20, the occupant protection ECU 55 proceeds to step S22 to determine whether or not the predetermined time Tf has elapsed from detection of the head-on collision by the head-on collision sensor 56. When the predetermined time Tf has elapsed, the occupant protection ECU 55 proceeds to step S24 to actuate the inflator 46 of the air belt device 44. This predetermined time Tf is so set as to correspond to a required length of time from the occurrence of the full overlap head-on collision to the start of actuation of the force limiter mechanism 26. Therefore, the supply of gas from the inflator 46 to the air belt 45 is started simultaneously with the start of actuation of the force limiter mechanism 26 or within the predetermined time after the start of the actuation of the force limiter mechanism 26.

Thus, in the vehicular occupant protection apparatus 10, the air belt 45 is inflated/deployed as shown in FIG. 1A during actuation of the force limiter mechanism 26 (while the occupant P moves forward with respect to the vehicle). In this case, the air belt 45 is extracted in accordance with the forward movement of the occupant P with respect to the vehicle. Therefore, the air belt 45 is voluminously inflated in a region from the shoulder part S of the occupant P to the chest part B thereof, especially in front of the chest part B with respect to the vehicle, and is deployed between the instrument panel 42 and the chest part B/the head part H of the occupant P leaning forward. Thus, the occupant P is efficiently protected from the full overlap head-on collision. The occupant protection ECU 55 ends the performance of control.

When it is determined in step S18 that the head-on collision is not a full overlap head-on collision, namely, that the head-on collision is an offset head-on collision, the occupant protection ECU 55 proceeds to step S26 to actuate the micro gas generator 40C, namely, the pretensioner mechanism 24. Thus, slack in the seatbelt 12 is removed as in the aforementioned case of the full overlap head-on collision. Further, as in the aforementioned case of the full overlap head-on collision, the lock mechanism 32 is passively actuated, and the force limiter mechanism 26 is then passively actuated.

After the execution of step S26, the occupant protection ECU 55 proceeds to step S28 to determine whether or not the predetermined time To has elapsed from detection of the head-on collision by the head-on collision sensor 56. When the predetermined time To has elapsed, the occupant protection ECU 55 proceeds to step S24 to actuate the inflator 46 of the air belt device 44. This predetermined time To is so set as to correspond to a required length of time from the occurrence of the offset head-on collision to the start of actuation of the force limiter mechanism 26. Therefore, the supply of gas from the inflator 46 to the air belt 45 is started simultaneously with the start of actuation of the force limiter mechanism 26 or within the predetermined time after the start of the actuation of the force limiter mechanism 26.

Thus, in the vehicular occupant protection apparatus 10, the air belt 45 is inflated/deployed as shown in FIG. 1A during actuation of the force limiter mechanism 26 (while the occupant P moves forward with respect to the vehicle) as in the aforementioned case of the full overlap head-on collision. Thus, the occupant P is efficiently protected from the offset head-on collision. The occupant protection ECU 55 then ends the performance of control.

Figure 7A:
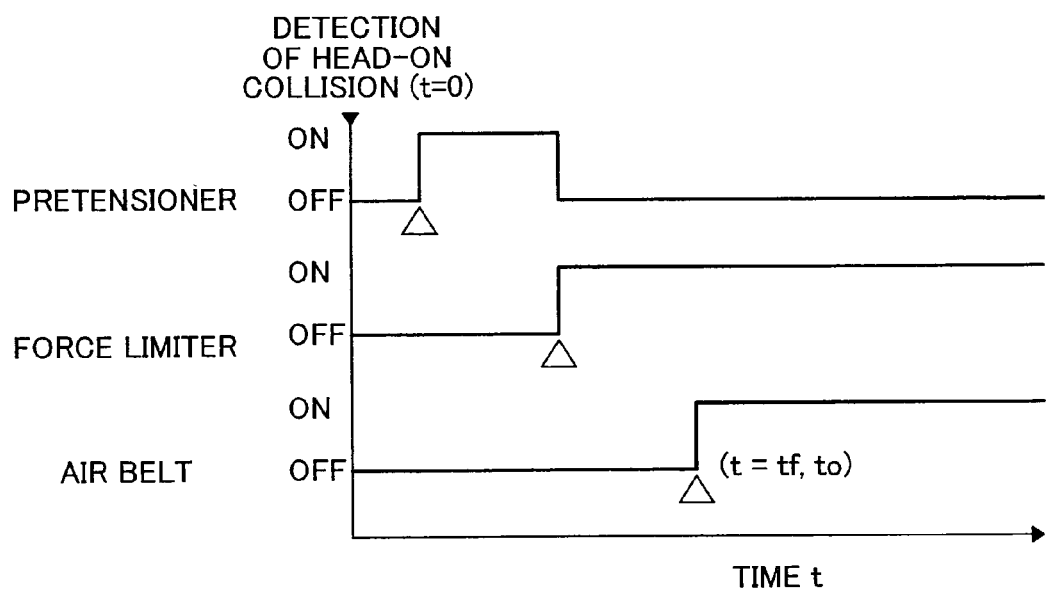
FIG. 7A is a timing chart showing timings for starting actuation of the pretensioner mechanism, the force limiter mechanism, and the air belt device, which constitute the vehicular occupant protection apparatus according to the first embodiment of the invention, in the event of a head-on collision.

It should be noted herein that, in the vehicular occupant protection apparatus 10, the occupant protection ECU 55 first actuates the pretensioner mechanism 24, awaits the start of actuation of the force limiter means 26, and actuates the air belt device 44 in the event of a head-on collision of the vehicle. That is, in the vehicular occupant protection apparatus 10, as shown in FIG. 7A, the pretensioner mechanism 24, the force limiter mechanism 26, and the air belt device 44 start being actuated in this order. Thus, in the vehicular occupant protection apparatus 10, the air belt 45 of the air belt device 44 is inflated/deployed during the period of actuation of the force limiter mechanism 26 as described above.

That is, in the vehicular occupant protection apparatus 10, the air belt 45 is deployed to protect the occupant P at a timing when the clearance between the occupant P and the instrument panel 42 becomes narrow. As a result, the air belt 45 and the inflator 46, which supplies the air belt 45 with gas, can be reduced in size in comparison with a comparative example in which an airbag for a head-on collision is deployed in front of a occupant before the actuation of a force limiter mechanism. Further, in the vehicular occupant protection apparatus 10, the air belt 45 is deployed at a timing when the occupant P is required to be protected (restrained) by the air belt 45. Therefore, the occupant P can be efficiently protected by the air belt 45 reduced in size as described above. Thus, in the vehicular occupant protection apparatus 10 according to the first embodiment of the invention, the air belt 45 and the inflator 46 (the air belt device 44) can be reduced in size while ensuring a occupant protection performance.

Especially in the vehicular occupant protection apparatus 10, the seatbelt 12, which is closely fitted to the occupant P, is provided with the air belt 45 as an inflation body. Therefore, the air belt 45 is likely to be deployed at a position where the occupant P is effectively protected. Thus, the performance of protecting the occupant P can be ensured by the (compact) air belt 45 reduced in size. Further, in the vehicular occupant protection apparatus 10, the timing for actuating the air belt device 44 is changed depending on whether the head-on collision is a full overlap head-on collision or an offset head-on collision. Therefore, the occupant P can be efficiently protected in accordance with the type of the head-on collision.

Figure 7B:
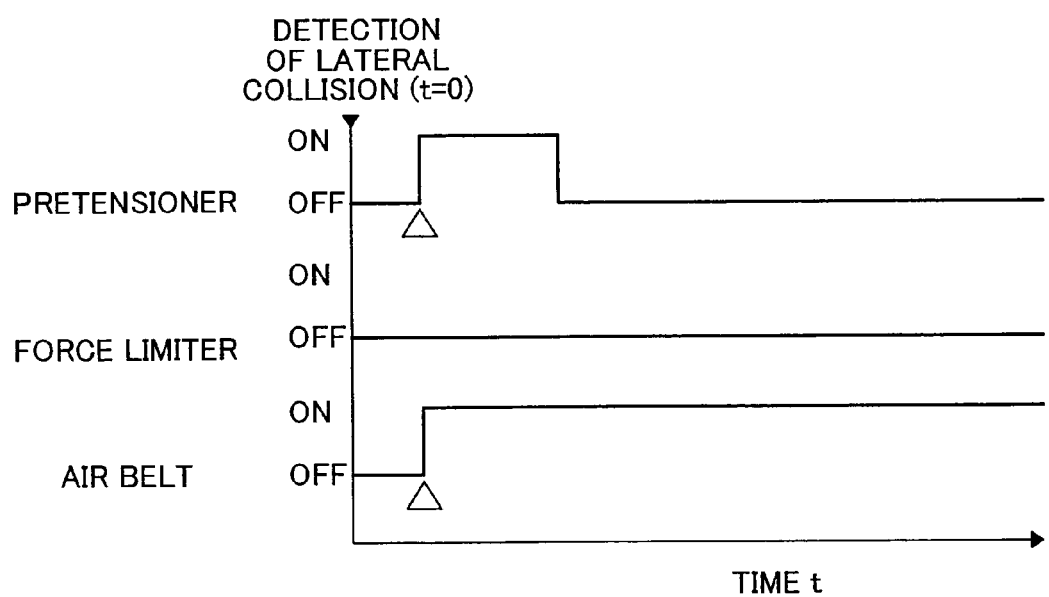
FIG. 7B is a timing chart showing timings for starting actuation of the pretensioner mechanism, the force limiter mechanism, and the air belt device, which constitute the vehicular occupant protection apparatus according to the first embodiment of the invention, in the event of a lateral collision.

Furthermore, in the vehicular occupant protection apparatus 10, when a lateral collision occurs, the air belt 45 is deployed immediately after detection of the lateral collision as shown in FIG. 7B. Therefore, the occupant P can be efficiently protected from a collision against the side door, which is located close to the occupant P. Then, the occupant P is protected from this lateral collision and from a head-on collision using the common air belt 45. Therefore, the airbag can be centralized in the vehicle. Further, the head-on collision airbag provided in the instrument panel 42 and the side airbag provided in the seatback 16 can also be dispensed with. Thus, a contribution to the centralization of the airbag in the vehicle as a whole can be made.

Further, a supplementary explanation of compatibility of the centralization and size reduction of the airbag will now be given. The air belt 45, which protects the occupant P from a lateral collision, is deployed above the shoulder part S of the occupant P and beside the head part H of the occupant P. Therefore, when the air belt 45 is deployed in the initial stages of a head-on collision, the air belt 45, which is deployed into a generally circular shape as viewed in a front cross-sectional view, is likely to slip on the shoulder part S. In order to efficiently protect the occupant P from the head-on collision, the air belt 45 needs to be increased in size. On the other hand, in the vehicular occupant protection apparatus 10, the air belt device 44 is actuated after the actuation of the force limiter mechanism 26. Therefore, the occupant P can be protected by deploying the air belt 45, which is small in size, in front of the chest part B while extracting the seat belt 12 (without a slip) in accordance with the forward movement of the occupant P with respect to the vehicle as described above.

Figure 10:
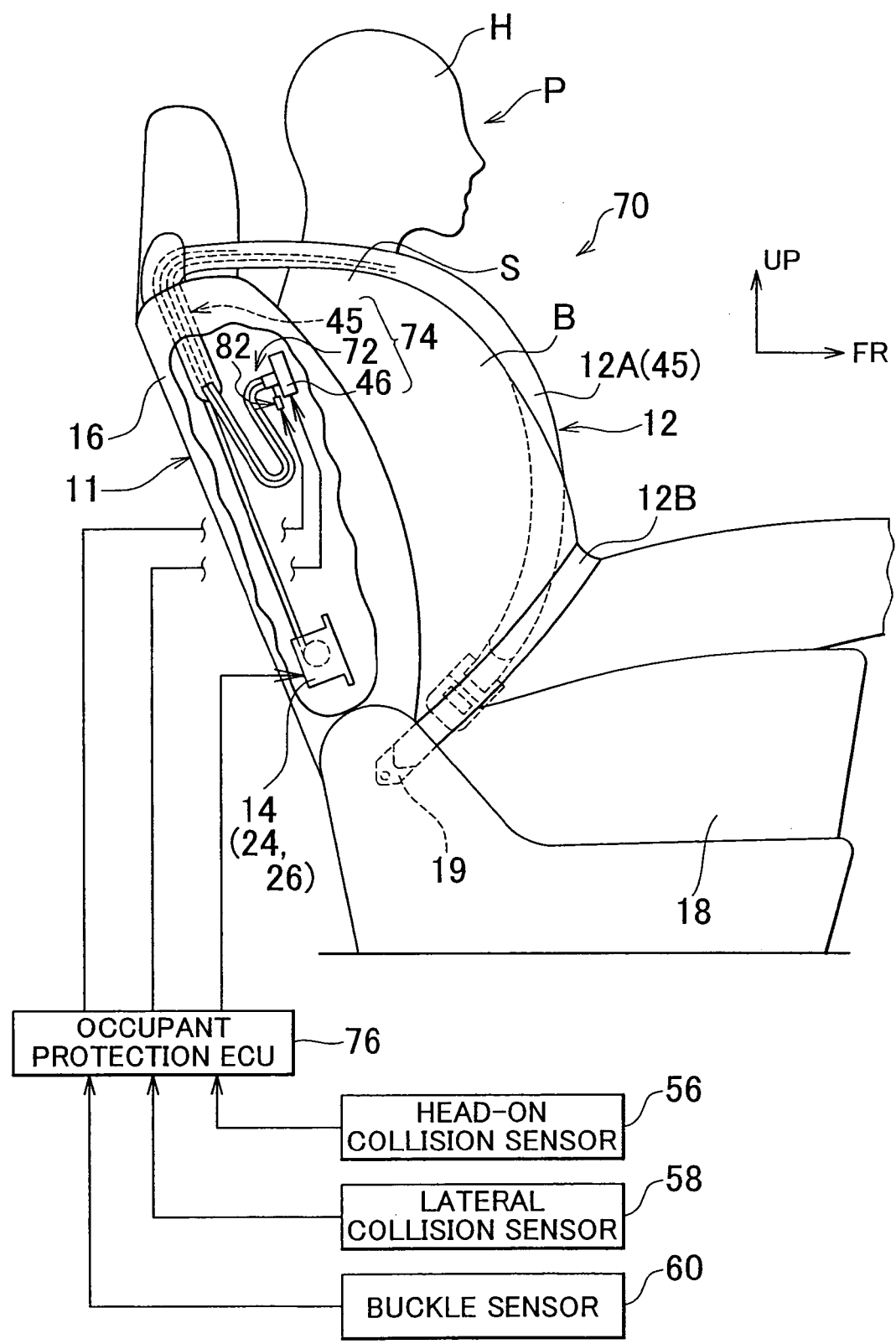
FIG. 10 is a partially cutaway lateral view showing a schematic overall construction of the vehicular occupant protection apparatus according to the second embodiment of the invention.

FIG. 10 is a partially cutaway lateral view corresponding to FIG. 2, showing a vehicular occupant protection apparatus 70 according to the second embodiment of the invention. Components and regions basically identical to those of the foregoing first embodiment of the invention or the aforementioned construction are described with the same reference symbols assigned thereto respectively, and may not be shown in the drawing.

As shown in this drawing, the vehicular occupant protection apparatus 70 is different from the vehicular occupant protection apparatus 10 according to the first embodiment of the invention in being equipped with an air belt device 74 further having a variable gas supply position structure 72 as a changeover device instead of being equipped with the air belt device 44.

The variable gas supply position structure 72 is provided between the air belt 45 (the airbag 52) and the inflator 46, and is controlled by a occupant protection ECU 76 such that the position where the airbag 52 is supplied with gas is changed depending on whether a head-on collision or a lateral collision occurs. Thus, in the vehicular occupant protection apparatus 70, the deployment position of the air belt 45 with respect to the longitudinal direction of the seatbelt 12 can be controlled. That is, the position of the start of deployment and the shape in the process of deployment can be changed in accordance with the collision type.

Figure 11:
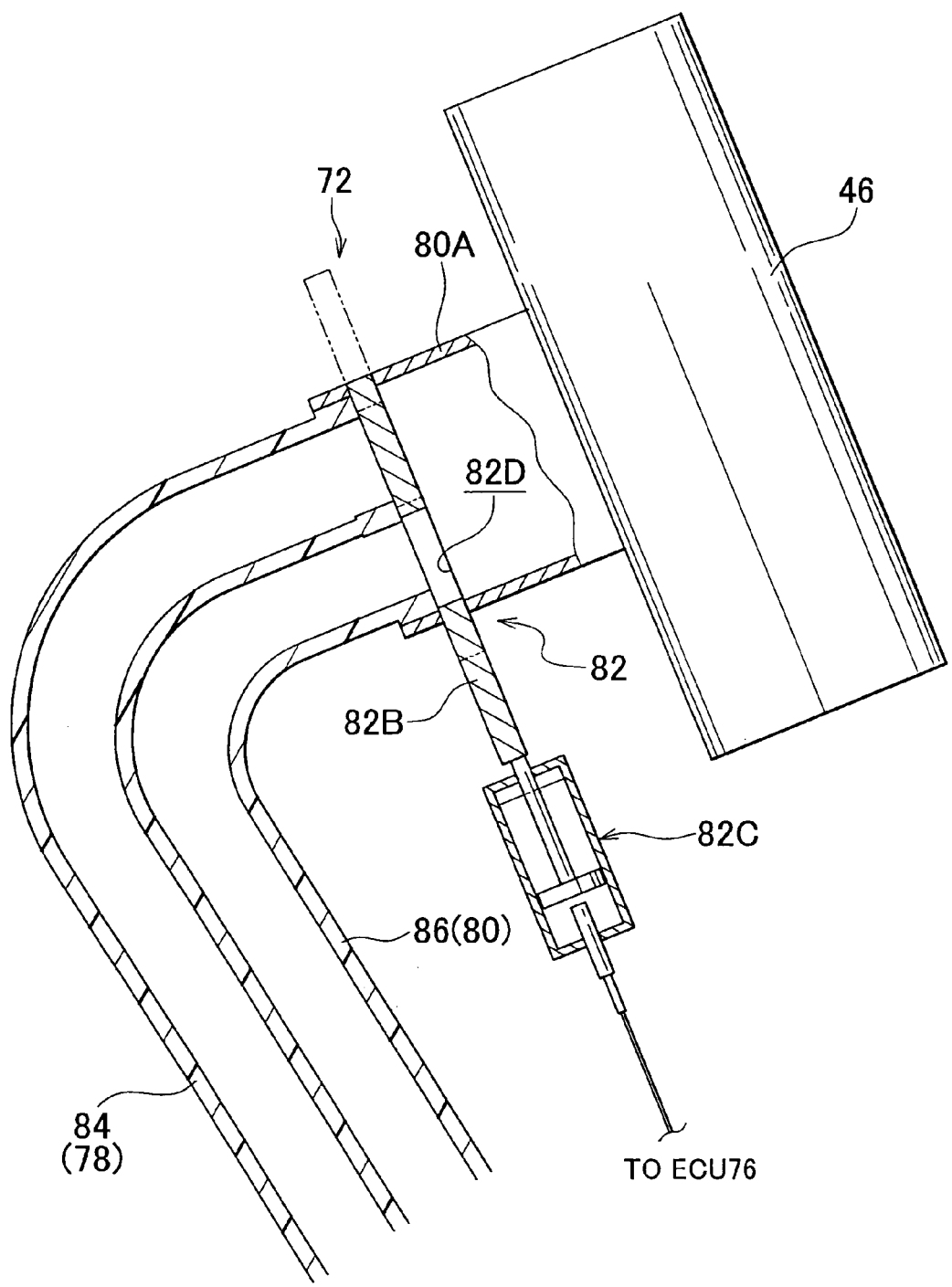
FIG. 11 is a cross-sectional view showing a variable gas supply position structure constituting the vehicular occupant protection apparatus according to the second embodiment of the invention.

More specifically, as shown in FIG. 11, the variable gas supply position structure 72 is equipped with a head-on collision gas supply pipe 78 for supplying the airbag 52 with gas in the event of a head-on collision, a lateral collision gas supply pipe 80 for supplying the airbag 52 with gas in the event of a lateral collision, and a gas supply destination changeover mechanism 82 for selectively supplying one of the head-on collision gas supply pipe 78 and the lateral collision gas supply pipe 80 with the gas generated by the inflator 46.

The head-on collision gas supply pipe 78 is disposed in the airbag 52 from that end of the air belt 45 which is located on the retractor 14 side to that region which is located in the vicinity of the chest part B of the occupant P when the seatbelt 12 (the air belt 45) is fitted to the occupant P. Accordingly, as shown in FIGS. 8A and 8B as well, a gas supply port 78A as a tip opening portion of the head-on gas supply pipe 78 supplies gas to that region of the air belt 45 which is located in the vicinity of the chest part B of the occupant P.

The lateral collision gas supply pipe 80 is disposed in the airbag 52 from that end of the air belt 45 which is located on the retractor 14 side to that region which is located in the vicinity of the shoulder part S of the occupant P when the seatbelt 12 (the air belt 45) is fitted to the occupant P. Accordingly, as shown in FIGS. 9A and 9B as well, a gas supply port 80A as a tip opening portion of the lateral collision gas supply pipe 80 supplies gas to that region of the air belt 45 which is located in the vicinity of the shoulder part S of the occupant P.

As shown in FIG. 11, the gas supply destination changeover mechanism 82 has a gas header 82A into which the gas from the inflator 46 flows. A flexible tube 84 communicating with the head-on collision gas supply pipe 78 and a flexible tube 86 communicating with the lateral collision gas supply pipe 80 are connected to the gas header 82A independently of each other. In this embodiment of the invention, the flexible tubes 84 and 86 have part of a tube wall in common. Further, the gas supply destination changeover mechanism 82 has a valve body 82B that can assume a lateral collision position (see a solid line of FIG. 11) where a communication port leading to the flexible tube 84 is closed and a communication port leading to the flexible tube 86 is open, and a head-on collision position (see a fictitious line of FIG. 11) where the communication port leading to the flexible tube 84 is open and the communication port leading to the flexible tube 86 is closed. In this embodiment of the invention, the valve body 82B is formed in the shape of a rectangle having a communication window 82D, and is designed to make a changeover between the head-on collision position where the valve body 82B slides in the longitudinal direction to make the position of the communication window 82D coincident with an opening end of the flexible tube 84, and the lateral collision position where the valve body 82B slides in the longitudinal direction to make the position of the communication window 82D coincident with an opening end of the flexible tube 86.

That is, the gas supply destination changeover mechanism 82 is designed such that a changeover in the gas supply destination for the air belt 45 (the airbag 52) can be made in accordance with the position of the valve body 82B. The gas supply destination changeover mechanism 82 has an actuator 82C that drives the valve body 82B between the lateral collision position and the head-on collision position. In this embodiment of the invention, the actuator 82C is designed to usually hold the valve body 82B at the lateral collision position and to drive the valve body 82B to the head-on collision position by being actuated by the occupant protection ECU 76. Further, in this embodiment of the invention, a micro gas generator (MGG) or a piezoelectric actuator, whose speed of response is high, is adopted as the actuator 82C.

The occupant protection ECU 76 is designed in the same manner as the occupant protection ECU 55 constituting the vehicular occupant protection apparatus 10 except in that the actuator 82C (the gas supply destination changeover mechanism 82) is actuated when a head-on collision is detected on the basis of a signal from the head-on collision sensor 56. Although not shown in the drawing, in this embodiment of the invention, the occupant protection ECU 76 actuates the actuator 82C between step S20 and step S24 and between step S26 and step S24. The other constructional details of the vehicular occupant protection apparatus 70 are identical to the corresponding constructional details of the vehicular occupant protection apparatus 10, including those not shown in the drawings.

Accordingly, the vehicular occupant protection apparatus 70 according to the second embodiment of the invention also makes it possible to basically achieve a similar effect through an operation similar to that of the vehicular occupant protection apparatus 10 according to the first embodiment of the invention. That part of the operation/effect of the vehicular occupant protection apparatus 70 which is different from the operation/effect of the vehicular occupant protection apparatus 10 will be mainly described hereinafter.

In the vehicular occupant protection apparatus 70 constructed as described above, when a head-on collision occurs, the occupant protection ECU 76 actuates the actuator 82C, and the valve body 82B is thereby moved to the head-on collision position prior to the actuation of the inflator 46 (the air belt device 44). Then, when the inflator 46 is actuated, the gas generated by the inflator 46 is supplied from the gas supply port 78A to the airbag 52 of the air belt 45 via the gas supply destination changeover mechanism 82, the flexible tube 84, and the head-on collision gas supply pipe 78. Then, that region of the air belt 45 which is located in the vicinity of the chest part B of the occupant P, namely, in the vicinity of the gas supply port 78A starts being inflated/deployed as shown in FIGS. 8A and 8B. That is, in the vehicular occupant protection apparatus 70, the air belt 45 starts being inflated/deployed first at that position of the occupant P which needs to be protected from a head-on collision by the air belt 45, and the occupant P is efficiently protected from the head-on collision by the air belt 45. There is no change in this respect regardless of whether the head-on collision is a full overlap head-on collision or an offset head-on collision.

On the other hand, in the event of a lateral collision, the occupant protection ECU 76 does not actuate the actuator 82C. Therefore, the inflator 46 is actuated with the valve body 82B located at the lateral collision position. Then, the gas generated by the inflator 46 is supplied from the gas supply port 80A to the airbag 52 of the air belt 45 via the gas supply destination changeover mechanism 82, the flexible tube 86, and the lateral collision gas supply pipe 80. Thus, that region of the air belt 45 which is located in the vicinity of the shoulder part S of the occupant P, namely, in the vicinity of the gas supply port 80A is inflated/deployed as shown in FIGS. 9A and 9B. That is, in the vehicular occupant protection apparatus 70, the air belt 45 starts being inflated/deployed first at that position of the occupant P which needs to be protected from a lateral collision by the air belt 45, and the occupant P is efficiently protected from the lateral collision by the air belt 45.

As described above, in the vehicular occupant protection apparatus 70, the occupant P can be efficiently protected by the air belt 45 deployed at a more appropriate position corresponding to a head-on collision or a lateral collision. That is, the air belt 45 (the airbag 52) can be centralized in the event of a head-on collision and in the event of a lateral collision while improving the occupant protection performance.

It should be noted that the second embodiment of the invention may adopt a construction in which that region of the airbag 52 which is supplied with gas from the gas supply port 78A is separated from that region of the airbag 52 which is supplied with gas from the gas supply port 80A by an inner cloth or the like. In this construction, the selectability of the deployment position of the air belt 45 with respect to the seatbelt 12 can be enhanced.

Figure 12:
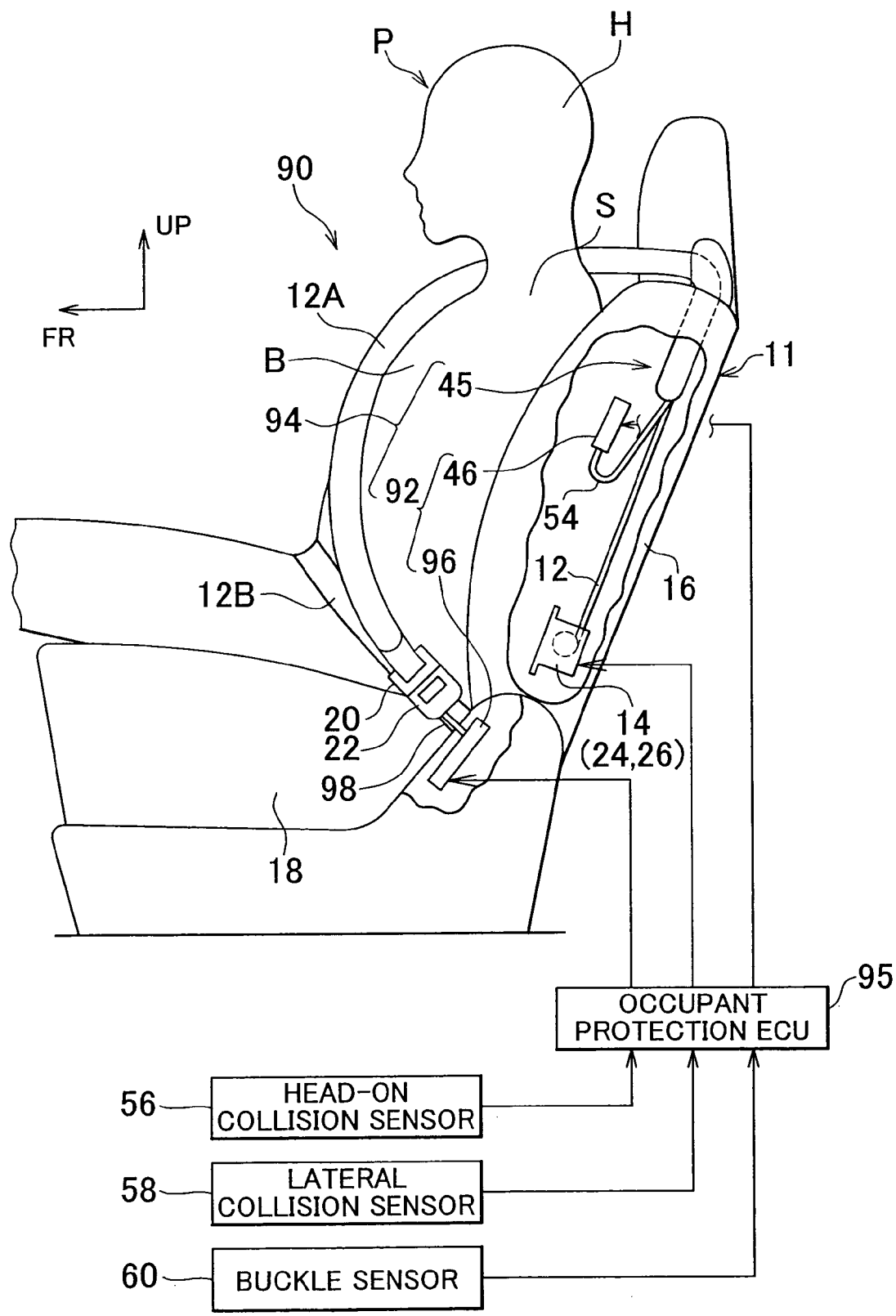
FIG. 12 is a partially cutaway lateral view showing a schematic overall construction of a vehicular occupant protection apparatus according to a third embodiment of the invention.

FIG. 12 is a partially cutaway lateral view corresponding to FIG. 10, showing a vehicular occupant protection apparatus 90 according to the third embodiment of the invention. Components and regions basically identical to those of the foregoing first and second embodiments of the invention or the aforementioned constructions are described with the same reference symbols assigned thereto respectively, and may not be shown in the drawing. As shown in this drawing, the vehicular occupant protection apparatus 90 is different from the vehicular occupant protection apparatus 70 according to the second embodiment of the invention in being equipped with an air belt device 94 having a variable gas supply direction structure 92 instead of being equipped with the air belt device 74.

The variable gas supply direction structure 92 is equipped with an inflator 96 that supplies the air belt 45 with gas from the buckle 22 side in addition to the inflator 46 that supplies the air belt 45 with gas from the retractor 14 side. The inflator 96 is disposed on, for example, a rear end side of the seat cushion 18 with respect to the vehicle, and communicates with the airbag 52 of the air belt 45 via a flexible tube 98, the buckle 22, and the tongue plate 20.

An occupant protection ECU 95 is electrically connected to the inflator 46 and the inflator 96, which constitute the variable gas supply direction structure 92 of the air belt device 94, and controls the actuation of these inflators. The occupant protection ECU 95 is designed in the same manner as the occupant protection ECU 55 constituting the vehicular occupant protection apparatus 10 except in actuating the inflator 96 instead of the inflator 46 when a head-on collision is detected on the basis of a signal from the head-on collision sensor 56. Although not shown in the drawing, the occupant protection ECU 95 actuates the inflator 96 in step S24 of FIG. 6 in this embodiment of the invention. The other constructional details of the vehicular occupant protection apparatus 90 are identical to the corresponding constructional details of the vehicular occupant protection apparatuses 10 and 70, including those not shown in the drawings.

Accordingly, the vehicular occupant protection apparatus 90 according to the third embodiment of the invention also makes it possible to basically achieve a similar effect through an operation similar to that of the vehicular occupant protection apparatus 10 according to the first embodiment of the invention. That part of the operation/effect of the vehicular occupant protection apparatus 90 which is different from the operation/effect of the vehicular occupant protection apparatus 10 will be mainly described hereinafter.

In the vehicular occupant protection apparatus 90 constructed as described above, when a head-on collision occurs, the occupant protection ECU 95 actuates the inflator 96, and the gas generated by the inflator 96 is supplied to the airbag 52 of the air belt 45 from the buckle 22 side. Then, that region of the air belt 45 which is located in the vicinity of the chest part B of the occupant P as the gas supply side is inflated/deployed (see FIGS. 8A and 8B as to the shape of the air belt 45). That is, in the vehicular occupant protection apparatus 90, the air belt 45 starts being inflated/deployed first at that position of the occupant P which needs to be protected from a head-on collision by the air belt 45, and the occupant P is efficiently protected from the head-on collision by the air belt 45. There is no change in this respect regardless of whether the head-on collision is a full overlap head-on collision or an offset head-on collision.

On the other hand, in the event of a lateral collision, the occupant protection ECU 95 actuates the inflator 46, and the gas generated by the inflator 46 is supplied to the airbag 52 of the air belt 45 from the retractor 14 side. Then, that region of the air belt 45 which is located in the vicinity of the shoulder part S of the occupant P as the gas supply side is inflated/deployed (see FIGS. 9A and 9B as to the shape of the air belt 45). That is, in the vehicular occupant protection apparatus 90, the air belt 45 starts being inflated/deployed first at that position of the occupant P which needs to be protected from a lateral collision by the air belt 45, and the occupant P is efficiently protected from the lateral collision by the air belt 45.

As described above, in the vehicular occupant protection apparatus 90, the occupant P can be efficiently protected by the air belt 45 deployed at a more appropriate position corresponding to a head-on collision or a lateral collision. That is, the air belt 45 (the airbag 52) can be centralized in the event of a head-on collision and in the event of a lateral collision while improving the occupant protection performance.

It should be noted that the third embodiment of the invention may adopt a construction in which that region of the airbag 52 which is supplied with gas from the inflator 46 is separated from that region of the airbag 52 which is supplied with gas from the inflator 96 by an inner cloth or the like. In this construction, the selectability of the deployment position of the air belt 45 with respect to the seatbelt 12 can be enhanced.

Further, in the third embodiment of the invention, for example, a lower portion of the air belt 45 with respect to the vehicle may be supplied with gas via, for example, the gas supply destination changeover mechanism 82 and the flexible tube 84 instead of being supplied with gas via the inflator 96 and the flexible tube 98. In this case, gas is supplied to an upper portion of the air belt 45 with respect to the vehicle via the flexible tube 86, and the variable gas supply direction structure 92 can be obtained with a construction having the common inflator 46. Further, the construction having the variable gas supply direction structure 92 may be provided with the head-on collision gas supply pipe 78 and the lateral collision gas supply pipe 80, which introduce gas to specific positions in the airbag 52 respectively.

Furthermore, in the third embodiment of the invention, that end of the seatbelt 12 which is located on the other side of the retractor 14 side may be rewound in an extractable manner by a retractor instead of being rewound by the anchor 19. In this construction, the tongue plate 20 can be joined with the buckle 22 at a suitable position without being slid in the longitudinal direction of the seatbelt 12. Thus, a contribution to reliable communication between the inflator 96 and the air belt 45 can be made.

Figure 13:
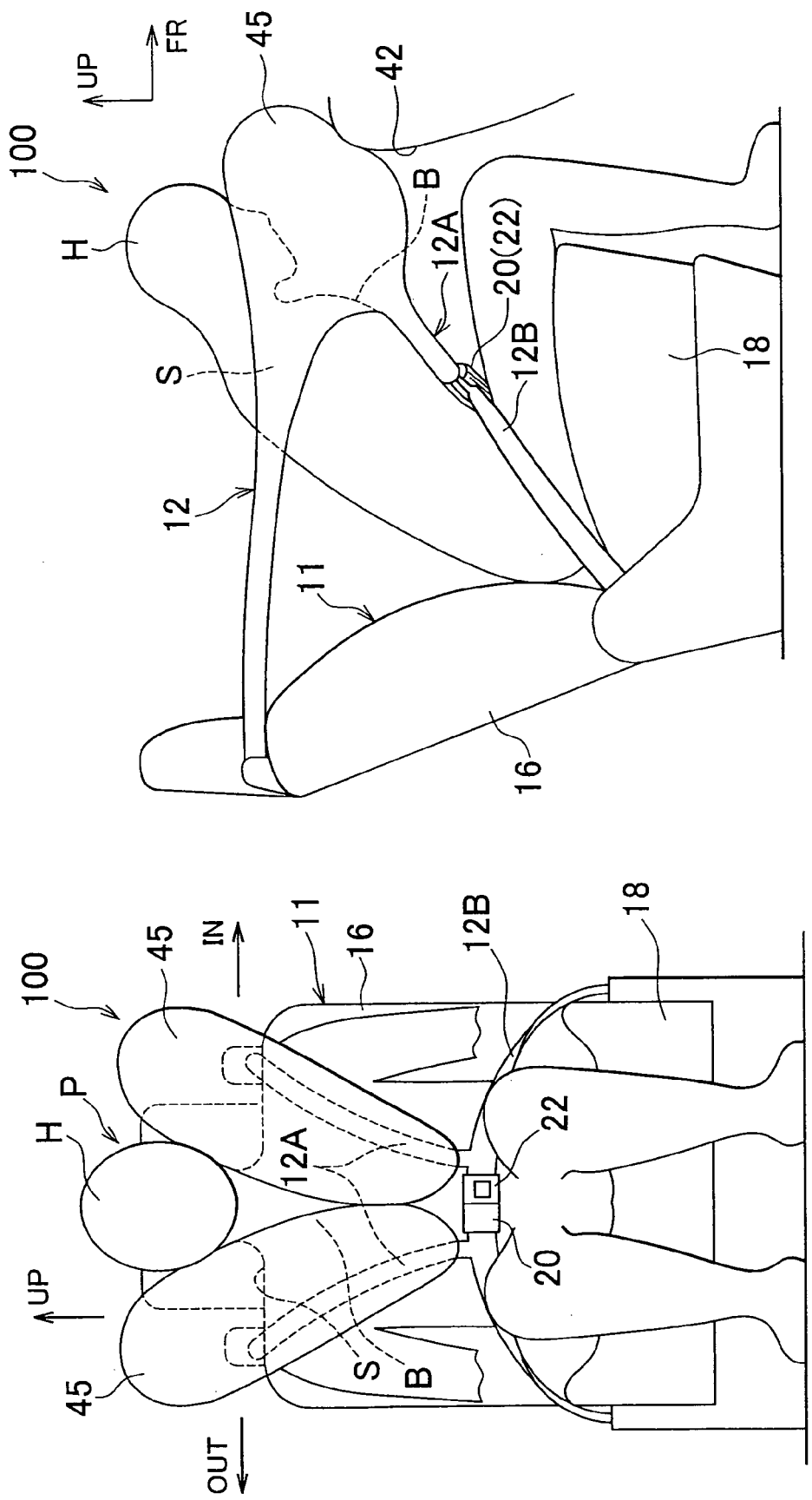
FIG. 13A is a front view showing an operated state of a vehicular occupant protection apparatus according to a fourth embodiment of the invention.
FIG. 13B is a lateral view showing the operated state of the vehicular occupant protection apparatus according to the fourth embodiment of the invention in the event of a head-on collision.
Figure 14:
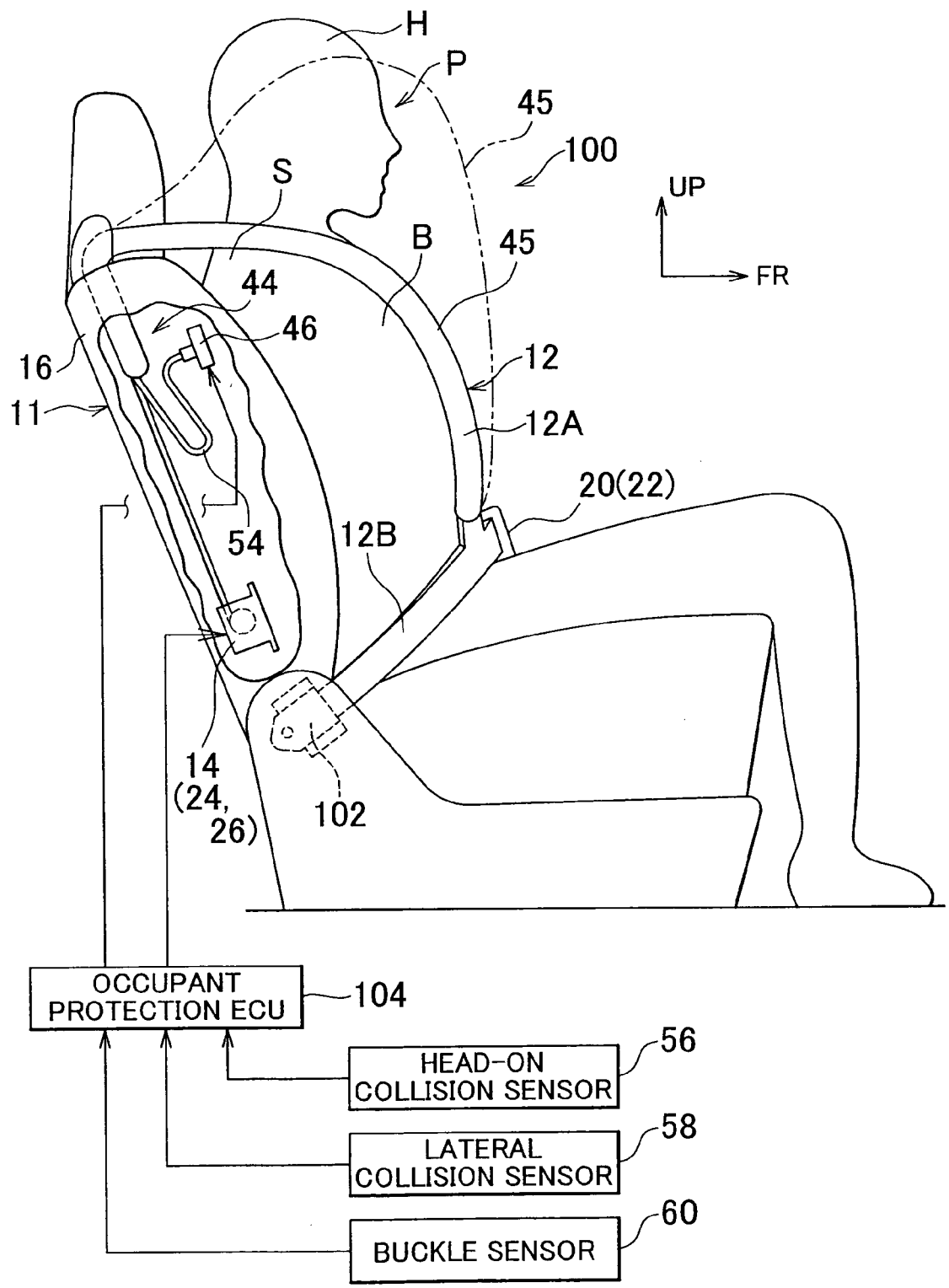
FIG. 14 is a partially cutaway lateral view showing a schematic overall construction of the vehicular occupant protection apparatus according to the fourth embodiment of the invention.

FIG. 14 is a partially cutaway lateral view corresponding to FIG. 2, showing a vehicular occupant protection apparatus 100 according to the fourth embodiment of the invention. Components and regions basically identical to those of the foregoing first to third embodiments of the invention or the aforementioned constructions are described with the same reference symbols assigned thereto respectively, and may not be shown in the drawing. Further, FIG. 13A is a schematic front view showing an operated state of the vehicular occupant protection apparatus 100 according to the fourth embodiment of the invention. FIG. 13B is a schematic lateral view showing the operated state of the vehicular occupant protection apparatus 100 according to the fourth embodiment of the invention. As shown in these drawings, the vehicular occupant protection apparatus 100 is different from the vehicular occupant protection apparatus 10 based on the three-point seat belt device in being equipped with a pair of right and left seatbelts 12 and designed as a occupant protection apparatus based on a so-called four-point seatbelt device.

More specifically, the right and left seatbelts 12 are rewound on upper end sides thereof by the retractor 14, and are rewound on lower end sides thereof in an extractable manner by a retractor 102. In this embodiment of the invention, the retractor 102 is disposed in a rear portion of the seat cushion 18 with respect to the vehicle. One of the seatbelts 12 is provided substantially at an intermediate portion thereof with the tongue plate 20, and the other seatbelt 12 is provided substantially at an intermediate portion thereof with the buckle 22. Thus, in the vehicular occupant protection apparatus 100, under a state of use with the tongue plate 20 engaged with the buckle 22, a pair of right and left shoulder belt portions 12A restrain the state of the occupant P sitting in the vehicular seat 11, and lap belt portions 12B constituted by the right and left seatbelts 12 restrain the lumbar part of the sitting occupant P.

In this vehicular occupant protection apparatus 100, the right and left shoulder belt portions 12A are provided with air belts 45 respectively. The construction of this vehicular occupant protection apparatus 100 can hence be regarded as having a pair of right and left air belt devices 44. A occupant protection ECU 104 constituting the vehicular occupant protection apparatus 100 is designed in the same manner as the occupant protection ECU 55 constituting the vehicular occupant protection apparatus 10 except in actuating right and left pretensioner mechanisms 24 simultaneously in S16, S20, and S26 of FIG. 6 and actuating right and left inflators 46 simultaneously in S16 and S24 of FIG. 6. The other constructional details of the vehicular occupant protection apparatus 100 are identical to the corresponding constructional details of the vehicular occupant protection apparatus 10, including those not shown in the drawings.

Accordingly, the vehicular occupant protection apparatus 100 according to the fourth embodiment of the invention also makes it possible to basically achieve a similar effect through an operation similar to that of the vehicular occupant protection apparatus 10 according to the first embodiment of the invention.

Further, in the vehicular occupant protection apparatus 100, the right and left shoulder belt portions 12A are provided with the air belts 45 respectively. Therefore, the occupant P can be more efficiently protected in the event of a head-on collision. Further, as for a lateral collision, the occupant P is efficiently protected also from contact with a vehicle interior member or the like on the other side of the collision.

Furthermore, in the four-point vehicular occupant protection apparatus having the right and left shoulder belt portions 12A joined with each other at the intermediate portions thereof in the longitudinal direction, when the air belts 45 are deployed in the initial stages of a head-on collision as described above, the shoulder part S slips with respect to the seatbelts 12, and a joint portion between the tongue plate 20 and the buckle 22 is likely to crawl up relatively (displacement of the joint portion is likely to be promoted). In order to efficiently protect the occupant P from the head-on collision, the air belts 45 need to be increased in size. On the other hand, in the vehicular occupant protection apparatus 100, the air belt devices 44 are actuated after the actuation of the force limiter mechanism 26. Therefore, in the four-point construction offering high performance in protecting the occupant P as described above, the occupant P can be protected by deploying the small-size air belts 45 in front of the chest part B while extracting the seatbelts 12 in accordance with the forward movement of the occupant P with respect to the vehicle (without a slip) as described above.

It should be noted that although the example in which both the ends of the right and left seatbelts 12 are rewound by the retractors 14 and 102 respectively in the vehicular occupant protection apparatus 100 is cited, it is also possible to adopt a construction in which each of the seatbelts 12 is rewound only on one side thereof by a retractor. In this case, it is preferable to provide slide means for sliding the tongue plate 20 and the buckle 22 with respect to the seatbelts 12.

Further, the vehicular occupant protection apparatus 100 may also adopt a construction in which the lap belt portions 12B are also provided with air belts respectively.

Figure 15:
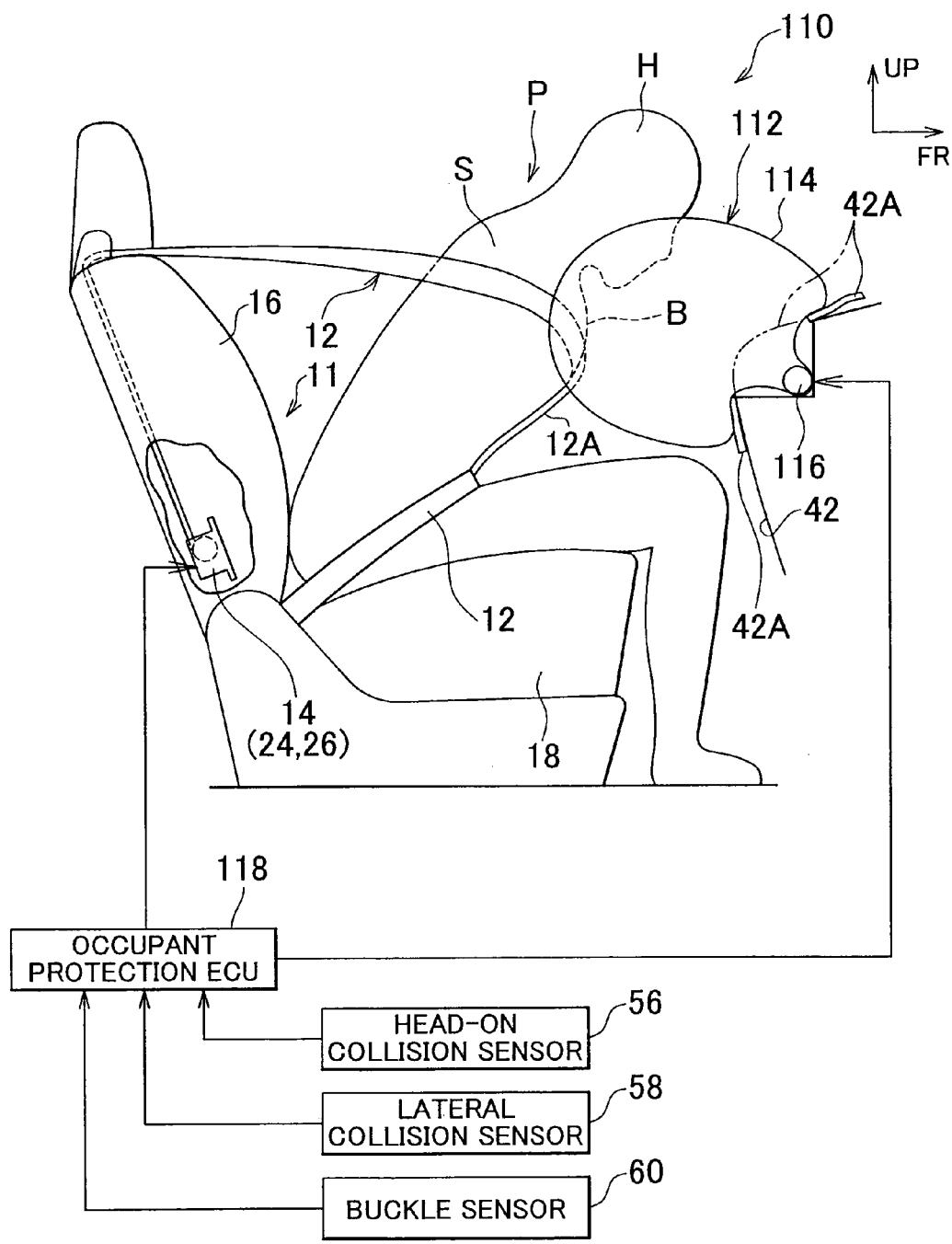
FIG. 15 is a partially cutaway lateral view showing a schematic overall construction in an operated state of a vehicular occupant protection apparatus according to the fifth embodiment of the invention.

FIG. 15 is a schematic lateral view showing an operated state of a vehicular occupant protection apparatus 110 according to the fifth embodiment of the invention. Components and regions basically identical to those of the foregoing first to fourth embodiments of the invention or the aforementioned constructions are described with the same reference symbols assigned thereto respectively, and may not be shown in the drawing. As shown in this drawing, the vehicular occupant protection apparatus 110 is different from the vehicular occupant protection apparatus 10 in that the seatbelt 12 is not provided with the air belt 45 (the air belt device 44) and that the instrumental panel 42 is provided with an airbag device 112 for a head-on collision as an inflation body deployment device.

The seatbelt 12 constitutes a three-point seatbelt device equipped with the pretensioner mechanism 24 and the force limiter mechanism 26. The airbag device 112 has an airbag 114 as an inflation body that is provided in a folded state in the instrumental panel 42 to be supplied with gas and inflated/deployed backward with respect to the vehicle, and an inflator 116 that supplies the airbag 114 with gas. The actuation of the inflator 116 is controlled by a occupant protection ECU 118. Upon being supplied with gas from the inflator 116, the airbag 114 cleaves an airbag door 42A formed on the instrument panel 42 through an inflation pressure, and is deployed inward with respect to a vehicle cabin (backward with respect to the vehicle).

The occupant protection ECU 118 performs control such that the inflator 116 is actuated simultaneously with the start of actuation of the force limiter mechanism 26 or after the start of actuation of the force limiter mechanism 26 when a head-on collision is detected on the basis of a signal from the head-on collision sensor 56. Thus, the air belt device 110 is designed such that the airbag 114 is deployed between the occupant P and the instrument panel 42 during a period of actuation of the force limiter mechanism 26.

Further, the vehicular occupant protection apparatus 110 is equipped with at least one of a side airbag device (not shown) and a curtain airbag device (not shown) to protect the occupant P from a lateral collision. The other constructional details of the vehicular occupant protection apparatus 110 are identical to the corresponding constructional details of the vehicular occupant protection apparatus 10, including those not shown in the drawings.

Accordingly, the vehicular occupant protection apparatus 110 according to the fifth embodiment of the invention also makes it possible to basically achieve a similar effect through an operation similar to that of the vehicular occupant protection apparatus 10 according to the first embodiment of the invention, except the effect of centralizing the head-on collision airbag and the lateral collision airbag. Further, in the vehicular occupant protection apparatus 110, the airbag device 112 (the airbag 114 and the inflator 116) can be reduced in size just as the air belt device 44 of the vehicular occupant protection apparatus 10 can be reduced in size. Therefore, the degree of freedom in designing the instrument panel 42 provided with the airbag device 112 is enhanced. Further, the degree of freedom in installing the airbag device 112 with respect to a vehicle interior member such as the instrument panel 42 or the like is also enhanced.

(Modification) In each of the foregoing embodiments of the invention, the example in which the retractor 14 is provided with the pretensioner mechanism 24 and the force limiter 26 is cited. However, the invention is not limited to this example. For example, in the three-point construction, at least one of the pretensioner mechanism 24 and the force limiter mechanism 26 may be provided between the buckle 22 and the vehicle body (the vehicular seat 11). In the four-point construction, at least the pretensioner mechanisms 24 or the force limiter mechanism 26 may be provided in the retractor 102 (or between the vehicle body and the anchor 19 provided in place of the retractor 102).

Further, in each of the foregoing embodiments of the invention, the example in which the pretensioner mechanism 24 rotationally drives the spool 30 by force in the rewinding direction is cited. However, the invention is not limited to this example. For example, in the aforementioned modification, the buckle 22 itself may be drawn toward the vehicle body side, and a pretensioner device may be constituted by an air belt for generating a tensile force, whose length is reduced through inflation. Further, it goes without saying that the force limiter device in the invention is not limited to a construction equipped with (only) the torsion bar 34 as an energy absorption member.

Furthermore, in each of the foregoing embodiments of the invention, the example in which the predetermined time Tf and the predetermined time To are constant is cited. However, the invention is not limited to this example. For example, it is also possible to adopt a construction in which the predetermined time Tf and the predetermined time To are continuously or gradually changed in accordance with a collision speed based on a signal from a vehicle speed sensor or a distance sensor that detects (changes over time in) a distance to a colliding object. This construction makes it possible to deploy the air belt 45 and the airbag 114 at a more appropriate timing during the period of actuation of the force limiter mechanism 26 at each collision speed.

Furthermore, in each of the foregoing embodiments of the invention, the example in which the pretensioner mechanism 24 is actuated after detection of a head-on collision is cited. However, the invention is not limited to this example. For example, it is also possible to adopt a construction in which the pretensioner mechanism 24 is actuated when an inevitable occurrence of a head-on collision is predicted. In this case as well, the air belt device 44, 74, or 94 and the airbag device 112 may be actuated against a head-on collision after the lapse of the predetermined time Tf or To from detection of the collision.

Furthermore, in each of the foregoing embodiments of the invention, the example in which the retractor 14 is provided in the seatback 16 is cited. However, the invention is not limited to this example. For example, the retractor 14 may be fixed in a pillar or to a vehicle body region behind the seatback 16 or the like.

Furthermore, in each of the foregoing embodiments of the invention, the example in which the invention is applied to the vehicular seat 11 (a front occupant seat) with the instrument panel 42 as a vehicle interior member disposed in front of the occupant P with respect to the vehicle is cited. However, the invention is not limited to this example. For example, the invention may be applied to a driver seat or a rear seat (which may be a seat in the second row or the third row).

Further, in each of the foregoing first to fourth embodiments of the invention, the example in which the pretensioner mechanism 24 and the air belt devices 44, 74, and 94 are actuated simultaneously in the event of a lateral collision is cited. However, the invention is not limited to this example. For example, it is also possible to adopt a construction in which the air belt device 44, 74, or 94 is actuated without actuating the pretensioner mechanism 24 in the event of a lateral collision.

While the invention has been described with reference to the example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An occupant protection apparatus comprising:
   a seatbelt including a region fitted to an occupant from a shoulder part thereof to a lumbar part thereof to restrain the occupant;
   a slack removal device that is actuated to remove slack in the seatbelt;
   a load limitation device that is actuated in response to a head-on collision of a vehicle to limit a restraint load applied to the occupant by the seatbelt;
   an inflation body deployment device that supplies an inflation body with a fluid to inflate/deploy the inflation body between the occupant and a vehicle interior member located in front of the occupant with respect to the vehicle; and
   a control device that actuates the slack removal device and actuates the inflation body deployment device such that the inflation body starts being supplied with the fluid upon or after start of actuation of the load limitation device following actuation of the slack removal device in an event of a head-on collision of the vehicle.

2. The occupant protection apparatus according to claim 1, wherein the inflation body is provided in a region including that region of the seatbelt which is fitted to a chest part of the occupant.

3. The occupant protection apparatus according to claim 2, wherein:
   the inflation body is provided in a region including that region of the seatbelt which is fitted to the shoulder part of the occupant; and
   the control device actuates the inflation body deployment device without actuating the slack removal device or actuates the inflation body deployment device and the slack removal device simultaneously in an event of a lateral collision of the vehicle.

4. The occupant protection apparatus according to claim 3, wherein:
   the inflation body deployment device is designed to allow the inflation body to be deployed at a plurality of deployment positions with respect to the seatbelt; and
   the control device actuates the inflation body deployment device such that the inflation body is deployed at one of the deployment positions which corresponds to a type of collision of the vehicle.

5. The occupant protection apparatus according to claim 4, wherein:
   the inflation body deployment device has set therein a plurality of fluid supply positions for the inflation body; and
   the control device actuates the inflation body deployment device such that the inflation body is supplied with the fluid at a position corresponding to the type of collision of the vehicle.

6. The occupant protection apparatus according to claim 5, wherein:
   the inflation body deployment device has a changeover mechanism for making a changeover among the fluid supply positions for the inflation body; and
   the changeover device is designed such that the fluid supply position for the inflation body is set at a position corresponding to a lateral collision, and changes over to a position corresponding to a head-on collision upon actuation of the changeover device.

7. The occupant protection apparatus according to claim 4, wherein:
   the inflation body deployment device has set therein a plurality of fluid supply directions for the inflation body; and
   the control device actuates the inflation body deployment device such that the inflation body is supplied with the fluid from a direction corresponding to the type of collision of the vehicle.

8. The occupant protection apparatus according to claim 1, wherein the inflation body includes a first inflation body provided on the vehicle interior member.

9. The occupant protection apparatus according to claim 8, further comprising a second inflation body that is supplied with the fluid to be inflated/deployed between the occupant and a vehicle interior member located beside the occupant with respect to the vehicle, wherein
   the second inflation body is controlled by the control device.

10. The occupant protection apparatus according to claim 9, wherein the control device inflates/deploys the second inflation body without actuating the slack removal device or inflates/deploys the second inflation body and actuates the slack removal device simultaneously in an event of a lateral collision of the vehicle.

11. The occupant protection apparatus according to claim 1, wherein the inflation body deployment device is actuated during actuation of the load limitation device when start of actuation of the load limitation device precedes actuation of the inflation body deployment device.

12. The occupant protection apparatus according to claim 1, wherein the control device changes a time from detection of a head-on collision of the vehicle to actuation of the inflation body deployment device depending on whether the head-on collision is a full overlap head-on collision or an offset head-on collision.

13. The occupant protection apparatus according to claim 12, wherein the control device sets a time from detection of the full overlap head-on collision to actuation of the inflation body deployment device shorter than a time from detection of the offset head-on collision to actuation of the inflation body deployment device.

14. The occupant protection apparatus according to claim 13, wherein
   the time from detection of the full overlap head-on collision to actuation of the inflation body deployment device is 50 to 70 milliseconds, and
   the time from detection of the offset head-on collision to actuation of the inflation body deployment device is 70 to 90 milliseconds.

15. A control method for an occupant protection apparatus having
   a seatbelt including a region fitted to an occupant from a shoulder part thereof to a lumbar part thereof to restrain the occupant,
   a slack removal device that is actuated to remove slack in the seatbelt,
   a load limitation device that is actuated in response to a head-on collision of a vehicle to limit a restraint load applied to the occupant by the seatbelt, and
   an inflation body deployment device that supplies an inflation body with a fluid to inflate/deploy the inflation body between the occupant and a vehicle interior member located in front of the occupant with respect to the vehicle, the control method comprising:

actuating the slack removal device and actuating the inflation body deployment device such that the inflation body starts being supplied with the fluid upon or after start of actuation of the load limitation device following actuation of the slack removal device in an event of a head-on collision of the vehicle.

* * * * *